US012488680B2

(12) United States Patent
Morvan et al.

(10) Patent No.: US 12,488,680 B2
(45) Date of Patent: *Dec. 2, 2025

(54) COMMUNICATION WITHIN AN INTELLIGENT TRANSPORT SYSTEM FOR SIGNALING HIDDEN OBJECTS

(71) Applicant: CANON KABUSHIKI KAISHA, Tokyo (JP)

(72) Inventors: Isabelle Morvan, Chantepie (FR); Brice Le Houerou, Acigne (FR); Eric Nassor, Thorigne-Fouillard (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

This patent is subject to a terminal disclaimer.

(21) Appl. No.: 18/358,797

(22) Filed: Jul. 25, 2023

(65) Prior Publication Data
US 2024/0038060 A1 Feb. 1, 2024

(30) Foreign Application Priority Data

Jul. 28, 2022 (GB) ..................................... 2211071

(51) Int. Cl.
*G08G 1/01* (2006.01)
*G08G 1/017* (2006.01)
*G08G 1/052* (2006.01)

(52) U.S. Cl.
CPC .......... *G08G 1/0125* (2013.01); *G08G 1/017* (2013.01); *G08G 1/052* (2013.01)

(58) Field of Classification Search
CPC ......... H04W 4/38; H04W 4/40; H04W 4/023; G08G 1/0125; G08G 1/096741; G08G 1/0133; G08G 1/0116
See application file for complete search history.

(56) References Cited

U.S. PATENT DOCUMENTS

| 2018/0261095 | A1 | 9/2018 | Hang et al. |
| 2019/0114921 | A1 | 4/2019 | Cazzoli |
| 2020/0204952 | A1 | 6/2020 | Sorrentino |
| 2021/0020035 | A1* | 1/2021 | Tijink ................. G08G 1/0112 |
| 2021/0385865 | A1* | 12/2021 | Mueck ................. H04W 80/02 |

(Continued)

FOREIGN PATENT DOCUMENTS

| WO | 2018/202601 A1 | 11/2018 |
| WO | 2021194907 A1 | 9/2021 |

OTHER PUBLICATIONS

ETSI Ts 103 324 V0.0.22, Intelligent Transport System (ITS); Vehicular Communications; Basic Set of Applications; Specification of the Collective Perception Service, May 2021.

(Continued)

*Primary Examiner* — Mirza F Alam
(74) *Attorney, Agent, or Firm* — Canon U.S.A., Inc. IP Division

(57) ABSTRACT

According to some embodiments of the disclosure, it is provided a method of communication in an intelligent transport system, ITS. After having perceived an object within an area monitored by the ITS-S, at a first given time, an estimation of a state of the object is obtained at a second given time, if the object is no longer perceived by the ITS-S at the second given time and a Collective Perception Message, CPM, comprising items of information related to the estimated state of the object is transmitted.

16 Claims, 10 Drawing Sheets

(56) References Cited

U.S. PATENT DOCUMENTS

| | | | |
|---|---|---|---|
| 2022/0264265 A1* | 8/2022 | Kwak | H04W 84/005 |
| 2023/0110467 A1* | 4/2023 | Jha | G08G 1/096791 |
| | | | 701/24 |
| 2024/0196176 A1* | 6/2024 | Leinmueller | H04W 4/38 |

OTHER PUBLICATIONS

Privacy issues in Draft TS 103 324, ITSWG1-TS 103 324 (CPS) drafting session, Mar. 1, 2021.

Intelligent Transport Systems (ITS), Communications Architecture, ETSI EN 302 665 v1.1.1, Sep. 2010.

Intelligent Transport Systems (ITS), Vehicular Communications, Basic Set of Applications, Part 2: Collective Perception Service, Release 2, ETSI TS 103 324 v2.1.1, Jun. 2023.

Intelligent Transport Systems (ITS), Vehicular Communications, Basic Set of Applications, Part 2: Specification of Cooperative Awareness Basic Service, ETSI EN 302 637-2 v1.4.1, Apr. 2019.

Intelligent Transport Systems (ITS), Vehicular Communications, Basic Set of Applications, Part 3: Specifications of Decentralized Environmental Notification Basic Service, ETSI EN 302 637-3 v1.3.1, Apr. 2019.

Intelligent Transport Systems (ITS), Vehicular Communications, Basic Set of Applications, Analysis of the Collective Perception Service (CPS), Release 2, ETSI TR 103 562 v2.1.1, Dec. 2019.

Intelligent Transport Systems (ITS), Vulnerable Road Users (VRU) awareness, Part 3: Specification of VRU awareness basic service, Release 2, ETSI TS 103 300-3 v2.2.1, Feb. 2023.

Intelligent Transport Systems (ITS), Security, Security Services and Architecture, ETSI TS 102 731 v1.1.1, Sep. 2010.

Intelligent Transport Systems (ITS), Security, Security header and certificate formats, Release 2, ETSI TS 103 097 v2.1.1, Oct. 2021.

Intelligent Transport Systems (ITS), Application Object Iedentifier (ITS-AID), Registration List, ETSI TR 102 965 v1.1.1, Mar. 2013.

* cited by examiner

COMMUNICATION WITHIN AN INTELLIGENT TRANSPORT SYSTEM FOR SIGNALING HIDDEN OBJECTS

CROSS REFERENCE TO RELATED APPLICATION

This application claims the benefit under 35 U.S.C. § 119(a)-(d) of United Kingdom Patent Application No. 2211071.2, filed on Jul. 28, 2022 and entitled "Improved communication within an intelligent transport system for signaling hidden objects". The above cited patent application is incorporated herein by reference in its entirety.

FIELD OF THE DISCLOSURE

The present disclosure relates generally to Intelligent Transport Systems (ITSs) and more specifically to Cooperative Intelligent Transport Systems (C-ITSs).

BACKGROUND OF THE DISCLOSURE

Cooperative Intelligent Transport Systems (C-ITSs) is an emerging technology for future transportation management that aims at improving road safety, traffic efficiency and driver experience.

Intelligent Transport Systems (ITS), as defined by the European Telecommunications Standards Institute (ETSI), include various types of communication such as:
- communications between vehicles (e.g., car-to-car), and
- communications between vehicles and stationary stations (e.g., car-to-infrastructure).

C-ITSs are not restricted to road transport as such. More generally, C-ITS may be defined as the use of information and communication technologies (ICT) for rail, water, and air transport, including navigation systems. Such various types of C-ITS generally rely on radio services for communication and use dedicated technologies.

Such C-ITSs are subject to standards, specified for each country and/or territory where C-ITSs are implemented. Today, in Europe, the European Telecommunications Standards Institute is in charge of the elaboration of the specifications forming the standards to which C-ITSs are subjected.

Cooperation within C-ITSs is achieved by exchange of messages, referred as to ITS messages, between ITS stations (denoted ITS-Ss). The ITS-Ss may be vehicles, Road Side Units (RSUs), Vulnerable Road Users (VRUs) carrying an ITS equipment (for instance included in a smartphone, a GPS device, a smart watch, or in a cyclist equipment), or any other entities or infrastructure equipped with an ITS equipment, as well as central subsystems (back-end systems and traffic management centers).

As observed above, C-ITSs may support various types of communications, for instance between vehicles (vehicle-to-vehicle or "V2V"), referring to all kinds of road users, e.g., car-to-car, or between vehicles and stationary stations such as vehicle-to-infrastructure or "V2I", and infrastructure-to-vehicle or "I2V", e.g., car-to-infrastructure.

Such exchanges of messages may be performed via a wireless network, referred to as "V2X" (for "vehicle" to any kind of devices) networks, examples of which may include 3GPP LTE-Advanced Pro, 3GPP 5G, or IEEE 802.11p technology (3GPP, LTE, and IEEE are Registered Trade Marks).

Exemplary ITS messages include Collective Perception Messages (CPMs), Cooperative Awareness Messages (CAMs), and Decentralized Environmental Notification Messages (DENMs). An ITS-S sending an ITS message is named an "originating" ITS-S and an ITS-S receiving an ITS message is named a "receiving" ITS-S.

It is recalled here that ETSI TS 103 324 (V0.0.29 of May 2022) standard defines the Collective Perception Service, that may be used by an ITS-S having an on-board sensor system to detect objects in its vicinity and to transmit, using broadcast CPMs, description information (e.g., dynamics such as a position and/or kinematic information) thereof. The CPMs are generally periodically sent with a period varying from 100 milliseconds to one second depending, for example, on the speed of the objects sensed by the originating ITS-S.

It is also to be noted that EN 302 637-2 (V1.4.1 of April 2019) standard defines the Cooperative Awareness Basic Service, that may be used by an ITS-S to transmit, using broadcast CAMs, its ego-vehicle dynamics (e.g., its position and speed).

It is also to be noted that EN 302 637-3 (V1.3.1 of April 2019) standard defines the Decentralized Environmental Notification Basic Service, that may be used by an originating ITS-S to send, using broadcast DENMs, notifications to other ITS-Ss, such as warnings or alerts. Such a message notifies of an event (e.g., a road hazard, driving environment information, traffic condition information, etc.) detected by the originating ITS-S.

Each ITS station has an environment model called a Local Dynamic Map (LDM) that is regularly updated with highly dynamic data to locate vehicles, pedestrians, bicycles, etc. in the vicinity of the ITS station. The LDM is updated using information from on-board sensors and completed with information from received ITS messages such as:
- awareness messages containing the ego-position and the speed of connected vehicles (CAM) or of connected Vulnerable Road Users (VAM) and
- collective perception messages (CPM) containing the perceived objects (e.g. vehicles, motorbikes, bicycles, or pedestrians) from sensor-equipped ITS stations. CPMs improve the local perception ability (larger field of view, non-connected objects, etc.).

As mentioned above, the Collective Perception Service allows a sensor-equipped ITS station to share, on a periodic basis, its perceived objects (e.g., vehicles or pedestrians) with other nearby ITS stations to improve their local environment perception using broadcast Collective Perception Messages (CPMs). The receiving ITS stations can then update their local environment model (LEM) with objects perceived by other ITS stations, and perform an association process with the data obtained from their on-board sensors to improve the reliability of the local environment model data. In addition, there exist ITS stations provided with behavior analysis or trajectory estimation functions that make it possible to estimate the state of objects based on their past trajectories and on knowledge of the local area (e.g. presence of an obstacle).

It is observed that CPMs complying with a first CPM version mainly contain information about the current state of the objects (e.g a current position, a current speed, an object classification, etc.) while CPMs complying with a second CPM version may include "predictions" related information to include potential future states of perceived objects. Indeed, ETSI Working Group, in the scope of Collective Perception Service, has studied the possible inclusion of prediction-related information in Collective Perception Message, the predicted paths corresponding to potential future states of perceived objects.

While exchanging items of information regarding the objects perceived by each ITS station enables an overall improvement in safety of the ITS users, it should be kept in mind that exchanging data between ITS stations and processing received data in each ITS station is resource intensive (e.g., bandwidth, processing, etc.). Therefore, there is a constant need to improve the selection of transmitted data to increase the overall safety of the system.

SUMMARY OF THE DISCLOSURE

The present disclosure has been devised to address one or more of the foregoing concerns.

According to some embodiments of the disclosure, it is proposed to share, within CPMs, an estimation of current states of objects that are no longer perceived by ITS-S on-board sensors.

According to a first aspect of the disclosure, there is provided a method of communication in an intelligent transport system, ITS, comprising at an ITS station, ITS-S:
perceiving, at a first given time, an object within an area monitored by the ITS-S; and
if the object is no longer perceived by the ITS-S at a second given time, obtaining an estimation of a state of the object at the second given time and transmitting a Collective Perception Message, CPM, comprising items of information related to the estimated state of the object.

Accordingly, the method of the disclosure makes it possible to improve the overall security of the ITS by signaling the potential presence of an object and to simplify data fusion by keeping the same identifier for an object that is momentarily not perceived.

According to some embodiments, the method further comprises transmitting a CPM comprising items of information signaling perception of the object, the CPM comprising items of information signaling perception of the object being different from and transmitted before the CPM comprising items of information related to the estimated state of the object, the items of information signaling perception of the object comprising an identifier of the object, the CPM comprising the items of information related to the estimated state of the object further comprising the same identifier of the object.

According to some embodiments, the CPM comprising items of information related to the estimated state of the object further comprises an indication to signal that the object is not perceived.

According to some embodiments, the indication comprises a predetermined type of a sensor from which the estimated state of the object is deemed to be obtained.

According to some embodiments, the indication comprises a confidence value belonging to a predetermined range of values.

According to some embodiments, the CPM comprising items of information related to the estimated state of the object further comprises a specific data structure comprising a list of at least one estimated object which is no longer perceived, the list of at least one estimated object comprising the object.

According to some embodiments, the CPM comprising items of information related to the estimated state of the object further comprises a specific data structure comprising a list of at least one area that may contain objects no longer perceived, the list of at least one area comprising an area wherein the object is estimated to be located.

According to some embodiments, the items of information related to the estimated state of the object comprise an indication of a presence of the object, an estimated position of the object, an estimated trajectory including an estimated position of the object and a set of consecutive estimated positions, and/or an estimated velocity of the object.

The estimation of the current state can be an estimated position, an estimated speed, or a presence probability in an area. The estimated object information can be used to report about an occluded object or about the estimation of an object just near the limits of the sensor detection area (e.g. object leaving the field of view of a camera). Thus, ITS-Ss newly entered in the area can anticipate about the possible object presence without having received the previous CPMs.

According to some embodiments of the disclosure, it is proposed to keep the same identifier for the estimated object in CPM to facilitate the fusion process of receiving ITS-Ss to keep this object alive in their Local Dynamic Map during a certain period of time after the last perception was done.

According to a second aspect of the disclosure, there is provided a method of communication in an intelligent transport system, ITS, comprising at a receiving ITS station, ITS-S:
receiving a Collective Perception Message, CPM, comprising items of information related to an estimated state of an object and comprising an indication to signal that the object is not perceived by an originating ITS-S sending the CPM at the time of sending the CPM and determining the estimated state of the object from the received CPM.

Accordingly, the method of the disclosure makes it possible to improve the overall security of the ITS by signaling the potential presence of an object and to simplify data fusion by keeping the same identifier for an object that is momentarily not perceived.

According to some embodiments, the method further comprises receiving a CPM comprising items of information signaling perception of the object, the CPM comprising items of information signaling perception of the object being different from and transmitted before the CPM comprising items of information related to the estimated state of the object, the items of information signaling perception of the object comprising an identifier of the object, the CPM comprising the items of information related to the estimated state of the object further comprising the same identifier of the object.

According to some embodiments, the indication comprises a predetermined type of a sensor from which the estimated state of the object is deemed to be obtained.

According to some embodiments, indication comprises a confidence value belonging to a predetermined range of values.

According to some embodiments, the CPM comprising items of information related to the estimated state of the object further comprises a specific data structure comprising a list of at least one estimated object which is no longer perceived, the list of at least one estimated object comprising the object.

According to some embodiments, the CPM comprising items of information related to the estimated state of the object further comprises a specific data structure comprising a list of at least one area that may contain objects no longer perceived, the list of at least one area comprising an area wherein the estimated position of the object is located.

According to some embodiments, the items of information related to the estimated state of the object comprise an indication of a presence of the object, an estimated position of the object, an estimated trajectory including an estimated position of the object and a set of consecutive estimated positions, and/or an estimated velocity of the object.

According to other aspects of the disclosure, there is provided a device configured for carrying out each of the steps of the method described above and a non-transitory computer-readable medium storing a program which, when executed by a microprocessor or computer system in an Intelligent Transport System station, ITS-S, causes the ITS-S to perform each step of the method described above.

According to other aspects of the disclosure, there is provided a Collective Perception Message, CPM, to transmit information in an Intelligent Transport System, ITS, comprising items of information related to an estimated state of an object and comprising an indication to signal that the object is not perceived by an originating ITS-S sending the CPM at the time of sending the CPM.

These aspects of the disclosure have advantages similar to those mentioned above.

At least parts of the methods according to the disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the solutions of the present disclosure can be implemented in software, the solutions of the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g., a microwave or RF signal.

BRIEF DESCRIPTION OF THE DRAWINGS

Further advantages of the present disclosure will become apparent to those skilled in the art upon examination of the drawings and detailed description. Embodiments of the disclosure will now be described, by way of example only, and with reference to the following drawings, in which.

DETAILED DESCRIPTION OF THE DISCLOSURE

Figure 1:
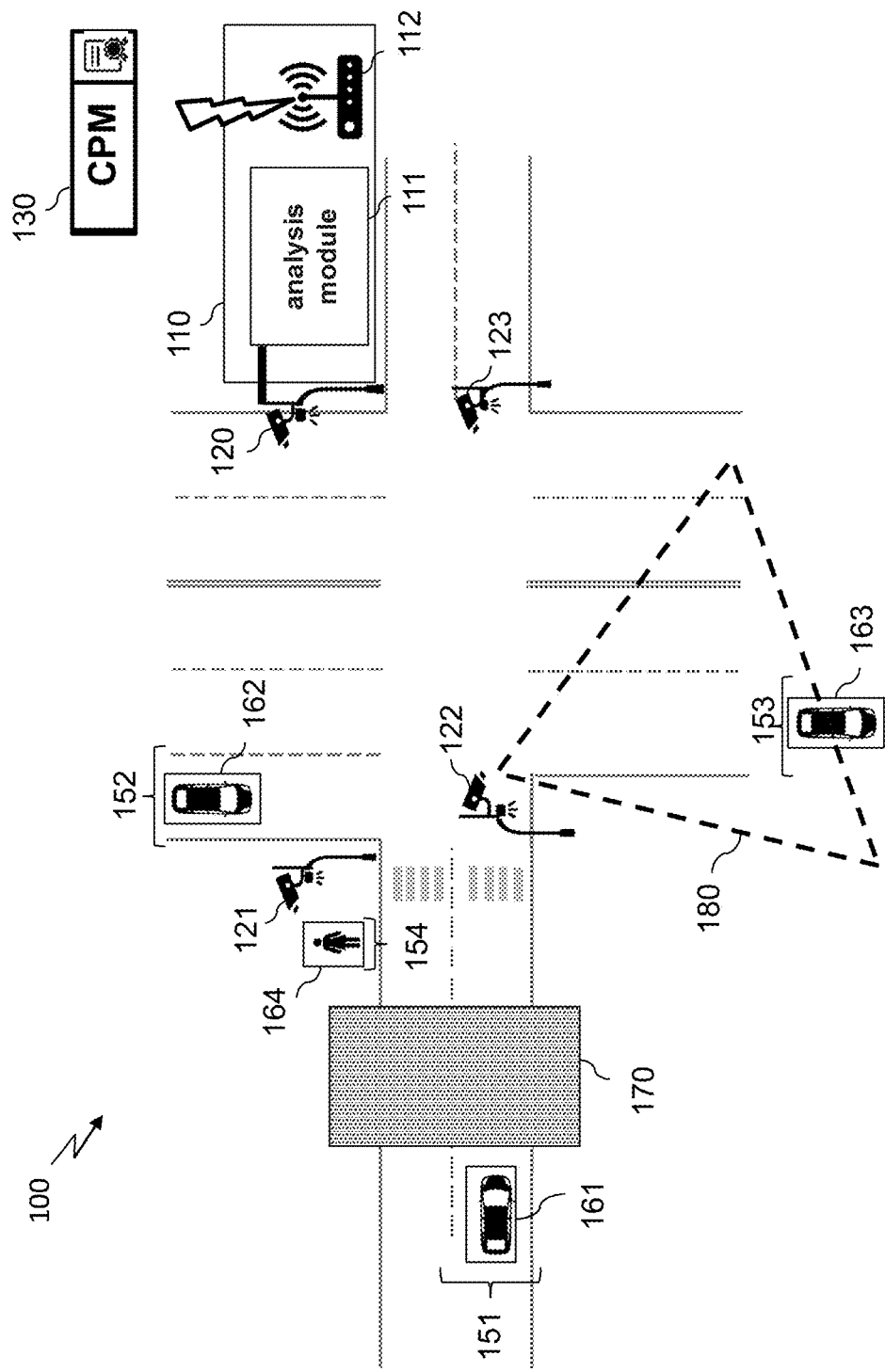
FIG. 1 illustrates an example of an ITS in which some embodiments of the present disclosure may be implemented.

The names of the lists and elements (such as data elements) provided in the following description are only illustrative. Embodiments are not limited thereto and other names could be used.

The embodiments of the present disclosure are intended to be implemented in Intelligent Transportation Systems (ITS).

It is noted that the first version of CPM (TS 103 324) contains information about the current state of objects (e.g., actual position, speed, object classification, etc.) based on sensor measurements. Upon receiving ITS messages, each ITS station carries out steps of a fusion process (also called association process) between data obtained from their own on-board sensors and data received within ITS messages. The fusion process is resource consuming, especially in dense area where there are many objects to keep track. To ease the fusion process, the CPM provides an almost-persistent object ID to track objects through successive generated CPMs. However, only information on objects perceived by ITS stations are included in broadcast CPMs.

The inventors have observed that some objects perceived by an ITS station may be occluded or hidden by other objects (e.g., a truck hiding a pedestrian or a car entering into a tunnel or passing under a bridge) during a short period of time. As a consequence, since these objects are no longer perceived, no more information about them is included in broadcast CPMs and when they appear again, they are considered as new objects with new identifiers. This leads to increasing the complexity of the fusion processing task within the ITS stations receiving these CPMs.

The inventors have also observed that new ITS-Ss entering into a particular area cannot have information about hidden objects since they have not received any previous CPM comprising information about these objects when they were perceived by another ITS-S (e.g., because the new ITS-Ss were out of the radio coverage of the originating ITS-S). Accordingly, when an occluded object reappears, new ITS stations may not anticipate their presence, in particular when the occluded object is not a connected ITS-S (i.e. a station emitting ITS awareness message).

Accordingly, the overall safety of an ITS may be improved by signaling the presence of occluded or hidden objects.

According to some embodiments of the present disclosure, a CPM, i.e. a message regularly transmitted by an originating ITS station to share perception of objects, free spaces, or space states perceived by its local sensors, comprises additional items of information about objects previously and recently perceived, that are no more perceived by the on-board sensors, for example due to some occlusion or that has just left limits of the detection area. In such cases, the objects are not perceived but their presence is estimated. There are denoted estimated objects in the following.

An example of such additional items of information is an indication that the object dynamics reported in a CPM are estimated items of information, which may be signaled by using a dedicated sensor type (e.g. estimation sensor), by using a dedicated flag (e.g. "estimated flag"), and/or by using an object confidence level reflecting an estimated object.

Accordingly, receiving ITS-Ss that are entering into a monitored area, may anticipate the presence of occluded objects or of objects located at the limit of the monitored area without having received previously generated CPMs comprising items of information about these objects at the time they were perceived. This helps to improve the road safety, for example by signaling the possible presence of vulnerable road users such as pedestrians that are likely to be occluded by other road traffic participants such as bus or trucks.

According to other embodiments of the present disclosure, a CPM comprises additional items of information (compared to known technic) containing a list of estimated objects with a reference to the identifiers of objects previously perceived and reported in CPMs. As a consequence, receiving ITS-Ss can keep track of objects during an occlusion of these, facilitating the fusion process in their local dynamic map (compared to known technic).

Still according to another embodiment of the present disclosure, a CPM comprises additional items of information (compared to known technic) containing a description of an area where the presence of objects that were previously perceived is likely. Therefore, receiving ITS-Ss may anticipate that an area may not be free (e.g. a given area may contain a pedestrian crossing the road behind a bus) and thus take the appropriate mitigation action (e.g. slowing down) to improve the road safety.

Its System and Its Station Comprising a Situation Analysis Module

FIG. 1 illustrates an example of an ITS 100 in which some embodiments of the present disclosure may be implemented.

According to this example, an ITS station, that may generate and transmit CPMs such as CPM 130, is embedded within a road side unit, RSU, 110. It is observed that RSUs have generally more processing resources to analyze behavior and predict trajectories than ITS-Ss embedded within moving vehicles. For example, an RSU may have a wider field of view than an ITS-S embedded within a vehicle, multiple fields of view, fast access to other information such as traffic conditions, traffic light status, knowledge of objects that populate the monitored area, etc.

In particular, a wide view of the area monitored by an RSU allows the RSU to learn and to analyze the trajectories of vehicles, motorbikes, cyclists, or pedestrians. The RSU may also have access to local peculiarities such as timetables of bus, school, presence of a temporary construction site, etc.

As illustrated, ITS 100 is implemented at an intersection and comprises stationary road side unit 110 and several entities that may carry or embed an ITS station (ITS-S) each, for transmitting and/or receiving ITS messages within the ITS. The several entities may be for example, vehicles 151, 152, 153 and a pedestrian 154.

Stationary road side unit 110 includes a set of sensors, such as image sensors, here video cameras 120, 121, 122, and 123 and an analytical module to analyze data provided by the sensors, such as analysis module (or situation analysis module) 111. Each of the video cameras 120, 121, 122, and 123 is configured to monitor or scan a portion of the area monitored by the RSU (here the road intersection), making it possible to acquire images and/or videos of the monitored area. Other sensors such as LIDARs (laser imaging detection and ranging devices) may also be used.

The sensors are connected to the analysis module (e.g., video cameras 120, 121, 122, and 123 are connected to analysis module 111) so that the analysis module may process the stream captured by the sensors/video cameras to analyze the traffic and to predict future states of the traffic participants. The analysis module and the sensors may be separated from or embedded within the same physical road side unit. For example, the analysis module may be wire-connected to sensors that may be remote sensors (i.e. not embedded within the road side unit).

The processing of the data received from the sensors by the analysis module, e.g., analysis module 111, aims at detecting objects potentially present in the monitored area, referred to as "perceived objects" or "detected objects" hereinafter. Mechanisms to detect such objects are well known by one skilled in the art.

The situation analysis module is also configured to output a list of the perceived objects respectively associated with corresponding description information referred to as "state vector". The state vector for a perceived object may include for instance parameters such as a position, a kinematic, temporal information, behavioral or object type classification information, etc.

Therefore, the situation analysis module may identify, among the perceived objects, Vulnerable Road Users (VRUs) such as pedestrians and cyclists as well as motorcyclists and also persons with disabilities or reduced mobility and orientation. It may also identify objects such as trees, road construction/work equipment (e.g., road barriers), and so on.

A VRU may be considered as an ITS-S when carrying an ITS equipment, for example an ITS equipment included in a smartphone, a satnav system, a smart watch, or in a cyclist equipment.

According to the example illustrated in FIG. 1, analysis module 111 may perceive the following objects when analyzing images of the monitored area:

objects 161, 162, and 163, respectively corresponding to vehicles 151, 152, and 153, and object 164 corresponding to pedestrian 154 on the sidewalk.

In addition, the perceived objects may be classified. For example, if the perceived objects are ITS stations, they can be classified as vehicles, VRUs, RSUs, or any another ITS-S types. Such object type classification may be based for example on predetermined rules, provided during the setting up of road side unit 110, or more generally the ITS-S. It is observed that ETSI TR 103 562 V2.1.1 defines for instance the categories "unknown", "vehicle", "person", "animal", and "other". Of course, other categories, more specific, may be defined.

According to some embodiments, the analysis module comprises behavior analysis and trajectory prediction functions to analyze the trajectories and the behavior of the perceived objects, to predict their future trajectories.

The analysis module may also have access to some information about the monitored area and about the road geometry such as the presence of fixed occlusion area 170 (e.g. the presence of a bridge). In particular, according to some embodiments of the disclosure, the analysis module is able to estimate the actual position of an object that was recently perceived by the sensors, if the object is occluded by a known element of the road geometry (e.g. bridge) or by another object (e.g. a pedestrian behind a bus) or if the object has just left the sensor detection area (e.g. vehicle 153 is at the limit of the sensor detection area 180 corresponding to the camera sensor 122).

As illustrated in FIG. 1, road side unit 110 further comprises a road side ITS-S, R-ITS-S, 112, for example as specified in the reference architecture of an ITS station defined in version V1.1.1 of the ETSI EN 302 665 specification.

Figure 4:
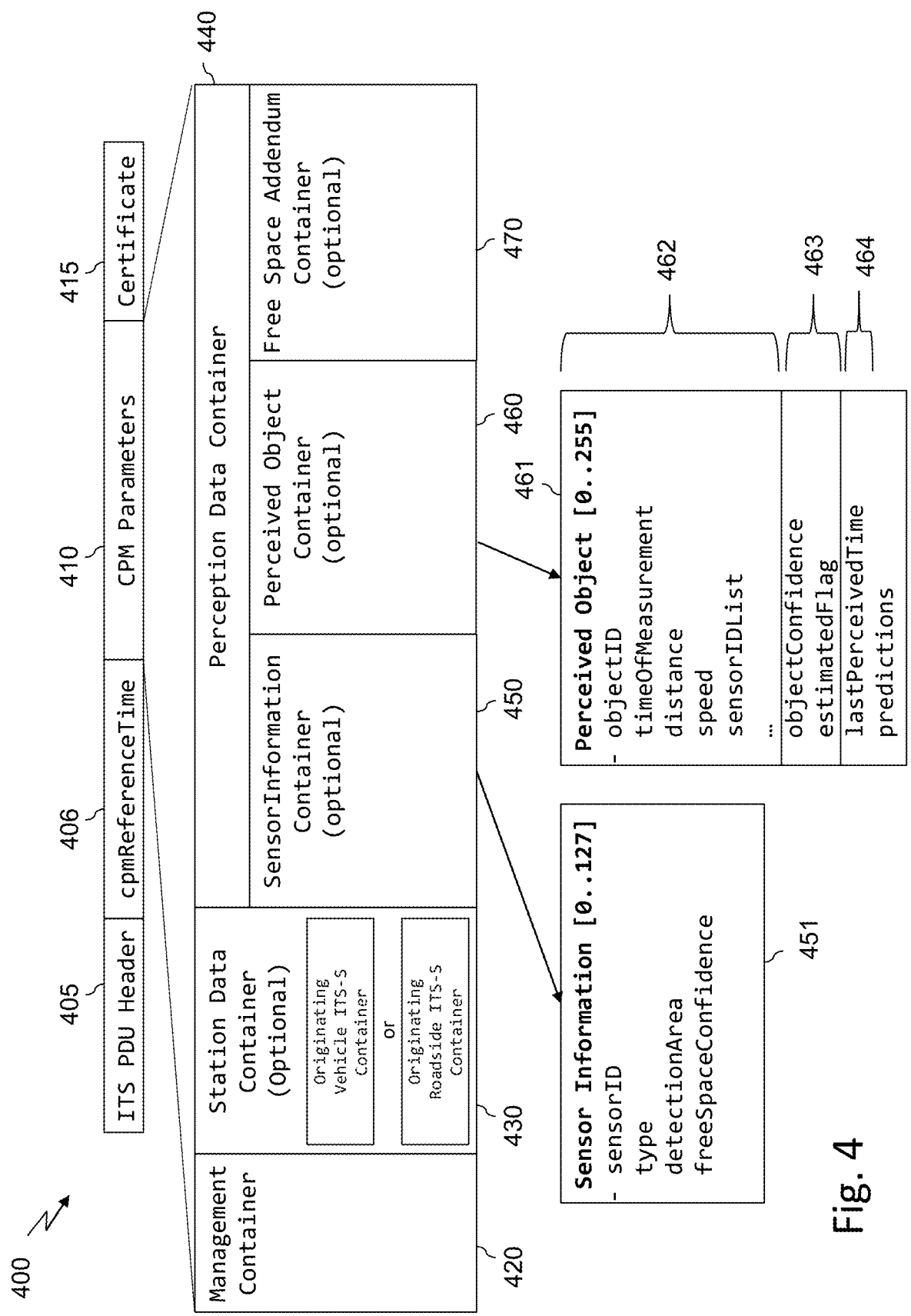
FIG. 4 illustrates an example of a structure of a collective perception message, CPM, according to some embodiments of the present disclosure.
Figure 5:
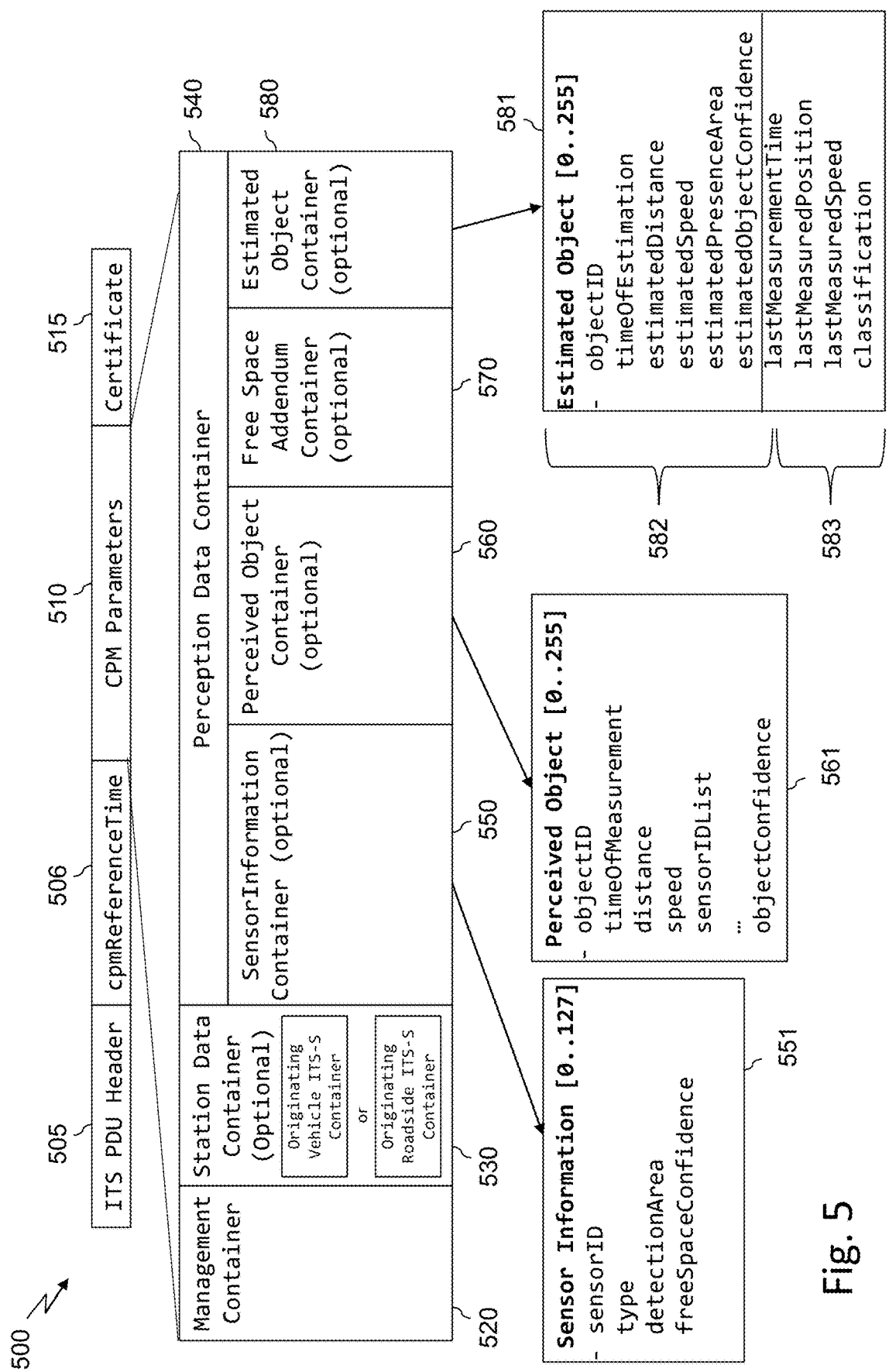
FIG. 5 illustrates an example of a structure of a collective perception message, CPM, extended with an estimated object container according to some embodiments of the present disclosure.
Figure 6:
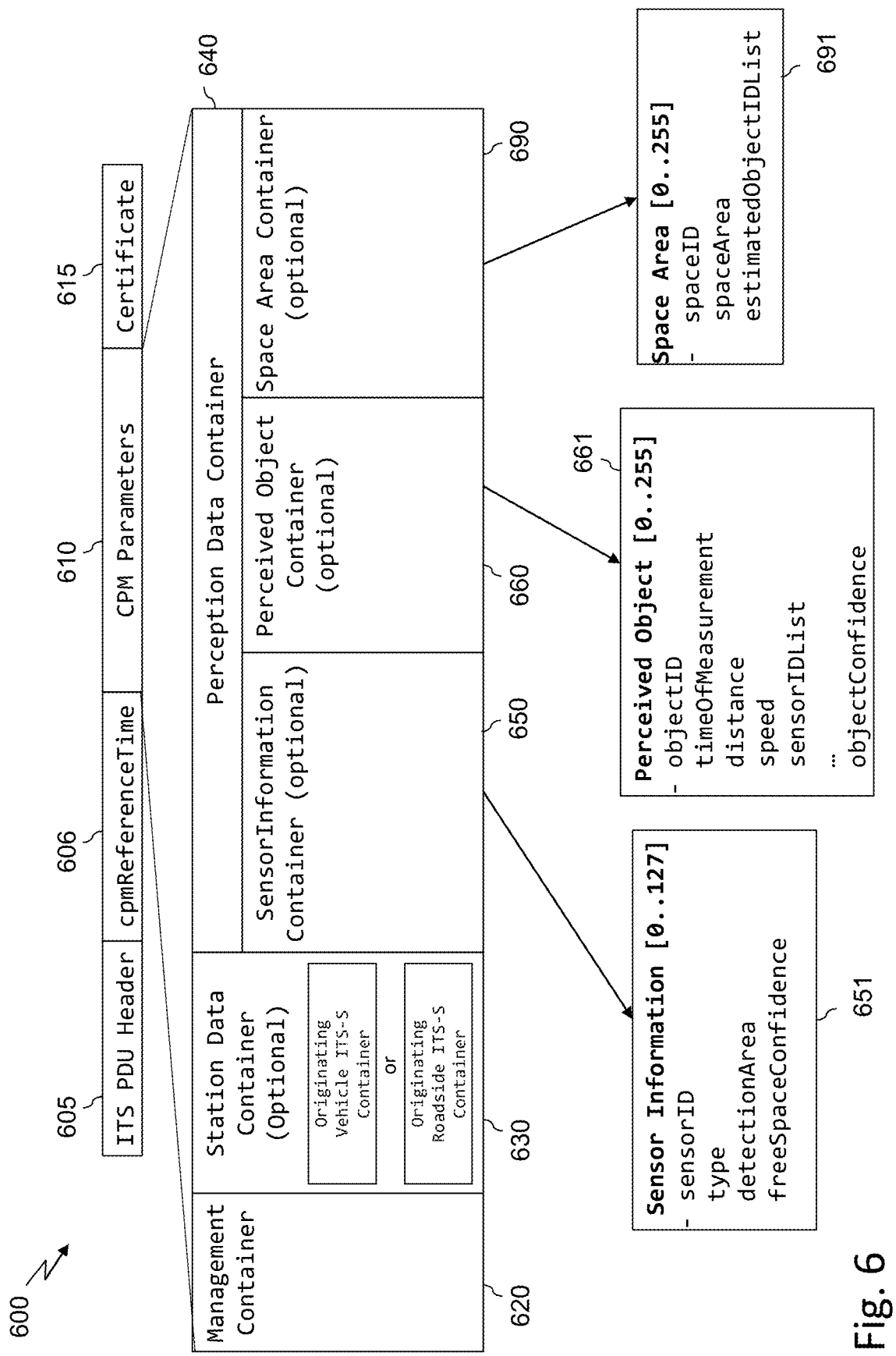
FIG. 6 illustrates an example of a structure of a collective perception message, CPM, extended with a space area container according to some embodiments of the present disclosure.

Thanks to roadside ITS-S 112, RSU 110 can share information relative to the perceived objects. Typically, RSU 110 can share such information with receiving ITS stations by sending ITS messages, particularly the so-called Collective Perception Messages, CPMs, e.g., CPM 130, for example as defined in documents ETSI TR 103 562 and ETSI TS 103 324, that are generally sent periodically. Examples of the format of a CPM according to some embodiments of the present disclosure is illustrated in FIG. 4, FIG. 5, and FIG. 6.

More generally, any ITS-S in ITS 100 may share information on the objects it perceives, by sending CPMs, as well as information on itself, by sending so-called Cooperative Awareness Messages, CAMs, for example as defined in document ETSI EN 302 637-2. CAMs may include a position, a kinematic (or dynamics), a unique station identifier, temporal information, behavioral or object type classification information, etc. Similarly, VRU Awareness Messages, VAMs, for example as defined in document ETSI TS 103 300-3, can be sent by VRU ITS-S to share their own position and kinematic or to share information corresponding to a group of VRUs (i.e., a VRU cluster).

The ITS messages are usually broadcast by their originating ITS-S, so that any other ITS-S can receive and exploit them.

All the messages exchanged over ITS 100 may help each ITS-S to have a good level of knowledge of its environment in terms of which objects are present, where and how they behave.

Figure 2:
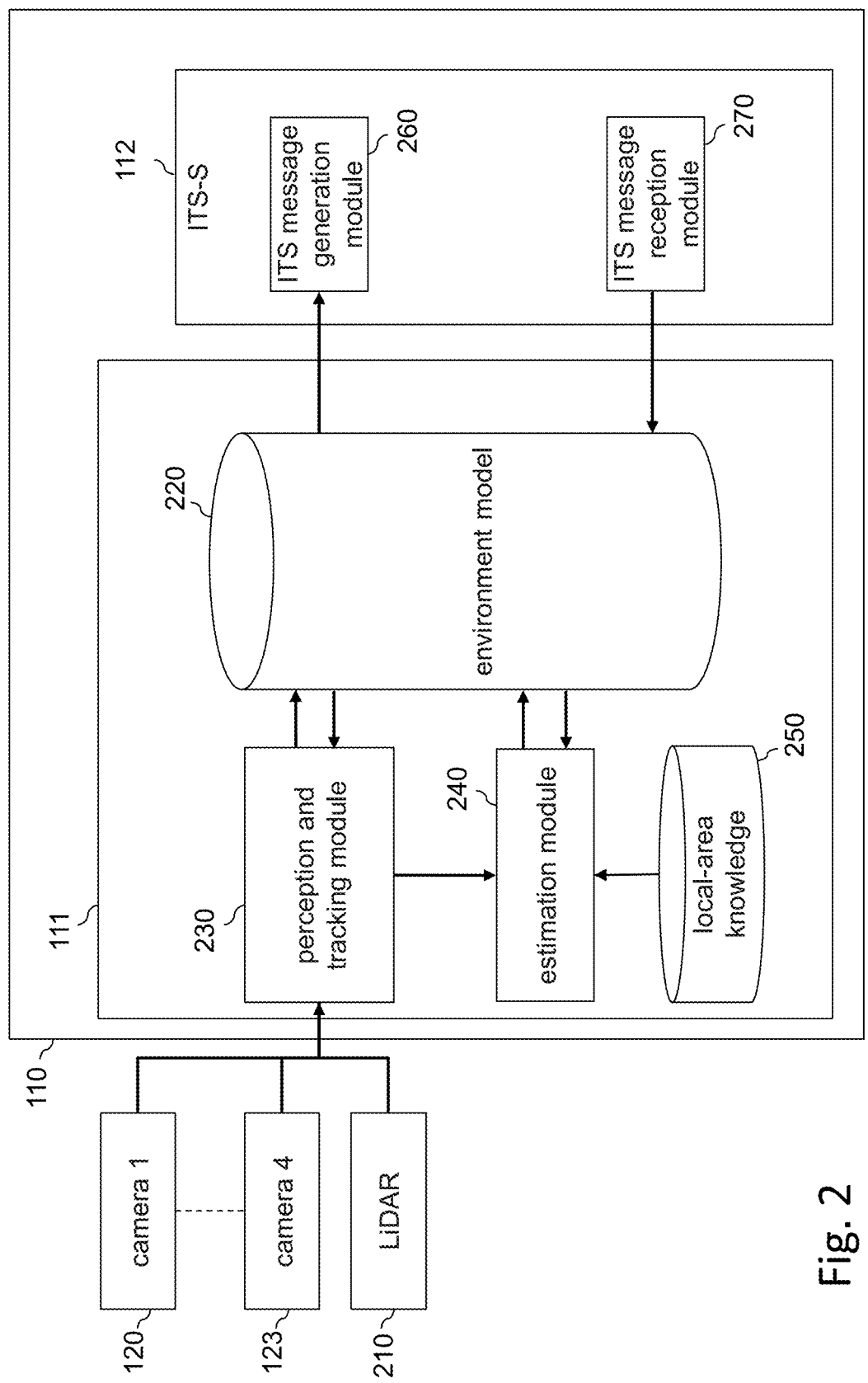
FIG. 2 illustrates an example of an ITS station in which some embodiments of the present disclosure may be implemented.

FIG. 2 illustrates an example of an ITS station in which some embodiments of the present disclosure may be implemented.

For the sake of illustration, it is considered here that the illustrated ITS station is the RSU referenced 110 in FIG. 1. However, it may be another type of ITS-S-equipped entity.

As mentioned above by reference to FIG. 1, analysis module 111 is connected to one or more sensors monitoring an area such as a road intersection. These sensors may include cameras 120 to 123 but also other sensors such as LIDAR 210 or mere radar devices.

The raw data acquired from these sensors may be processed by the perception and tracking module 230 of analysis module 111. According to some embodiments, the perception and tracking module 230 analyzes these raw data and uses sensor data fusion algorithms to combine or merge items of information directed to the same objects detected from the raw data acquired by several sensors, in order to perceive objects.

Consideration of similarity between objects perceived from raw data acquired from different sensors may be based on their object types, positions, kinetics/dynamics (speed, acceleration), trajectories, etc. A level of confidence may also be computed when scrutinizing the similarities of these items of information and the merging process may be affected by the level of confidence.

Items of information related to newly perceived objects and/or to already-tracked objects may be used to update the environment model 220 of the ITS-S. CAMs, VAMs, DENMs, and CPMs received from other ITS-Ss by the ITS message reception module 270 of ITS-S 112, conveying additional information, may also be used to update environment model 220.

The environment model (also known as the Local Dynamic Map) contains a list of the perceived objects. Each ITS-S has its own environment model 220.

In environment model 220, an object may be defined together with multiple items of information including, for example, all or some of the following:

objectID, which is the identifier of the perceived (or detected) object, timeOfMeasurement, which represents the moment when the (last) measurement concerning the perceived object was made, objectState, which comprises a description of the object kinematic state and attitude. It may contain at least the object position and speed at the moment of measurement such as:

objectPosition, which represents the position of the perceived object reference point. The object position may include the following information:

worldPosition, which represents the absolute position of the object (e.g., using GPS position or UTM coordinates at the moment of measurement), xCoordinate, yCoordinate, zCoordinate, which represent the distance to the perceived object from the originating ITS-S's reference position to object reference point in x-direction, y-direction and z-direction at the moment of measurement in a predefined coordinate system, with a corresponding level of confidence. For instance, RSU 112 may use the World Geodetic System 84 (WGS84) as the predefined coordinate system, objectSpeed, which is the speed of the perceived object. The object speed may include the following item of information as defined in EN 302 890-2:

speed, which is the speed of the object (e.g., vehicle driving speed), heading, which is the orientation of the horizontal velocity vector with respect to the WGS84 North (clockwise), as defined in EN 302 890-2, unless otherwise noted, and xSpeed, ySpeed, and z-Speed, which represent the speed of the perceived object in the detecting ITS-S's reference system in x-direction, y-direction, and z-direction at the moment of measurement, in the predefined coordinate system of the originating ITS-S, with a corresponding level of confidence, additional optional information may be added into the environment model for completing the description of the object kinematic state and attitude such as the object acceleration, roll angle, pitch angle, yaw angle, roll rate, pitch rate, and yaw rate, roll acceleration, pitch acceleration, and yaw acceleration provided at the moment of measurement from the ITS-S's reference position at the moment of measurement in the pre-defined coordinate system, planarObjectDimension (optional), which represents the dimensions of the perceived object that may be indicated within three fields planarObjectDimension1, planarObjectDimension2 and verticalObjectDimension, objectRefPoint, which is the reference point of the perceived object for which the kinematic attitude and state data are provided. By default, the reference point may be the center point of the perceived object, objectAge, which is the age of the perceived object, objectConfidence, which represents a confidence level associated with the perceived object. The computation of the object confidence is based on a sensor's or fusion system's specific detection confidence, the binary detection success (i.e. the detection success of the object during the last measurement), and the object age, sensorIDList (optional), which is a list of the sensor identifiers which provided the measurement data of the perceived object, objectDynamicStatus (optional), which indicates whether the perceived object is classified as a moving object (e.g., dynamic, hasBeenDynamic, static), classification (optional), which provides the classification of the perceived object, with a corresponding level of confidence, mapPosition, (optional), which indicates the position of the perceived object mapped onto the intersection topology description transmitted in MAP messages, predictions (optional), which indicated a list of predicted paths of the perceived object or other information related to prediction associated to an object.

Environment model 220 contains the latest measurement data of perceived objects and according to some embodiments of the disclosure, it can also keep history of the previous measurement data. Depending on the memory size of the ITS-S and on the number of perceived objects, the retention time of history data may vary (e.g. 2 minutes).

Estimation module 240 of analysis module 111 analyzes the behavior and trajectory of the perceived objects using as input the data from the perception and tracking module 230 and from the environment model 220. It may also use local-area knowledge 250 (e.g., a road geometry with indication of occlusion areas). According to some embodiments of the disclosure, estimation module 240 includes some additional information in environment model 220 to complete the model with estimation data for some previously perceived objects that were not perceived by the on-board sensors during the last measurement period. For the sake of illustration, such additional information may be all or some of the following:

estimatedObjectInformation (optional), which contains information about the presence of an estimated object (no more directly perceived). It may contain:

timeOfEstimation, which represents the moment when the (last) estimation concerning the estimated object was made, estimatedObjectState, which contains information representative of the presence of the estimated object. It may be expressed as a position and speed if it can be estimated with enough confidence or as an area where the object is having a probability to be present:

estimatedObjectPosition and estimatedObjectSpeed, which is an estimation of the object position and of the object speed at the time of estimation (similar to the measured objectPosition and objectSpeedof a perceived object, as described above), estimatedPresenceArea, which may be a polygon area where the object is estimated to be present, estimatedConfidenceLevel, which represents a level of confidence associated with the estimated object. The computation of the level of confidence may be based on a sensor's or fusion system's specific detection confidence, and the last time that the object was successfully detected.

According to some embodiments of the disclosure, estimation module 240 stops carrying out estimation for the considered object when the estimatedConfidenceLevel gets lower than a certain threshold, and this object is removed from the list of estimated (or tracked) objects.

The environment model 220 is regularly updated by the perception and tracking module 230, the estimation module 240, and the ITS message reception module 270. In particular, environment model 220 may be updated according to VAM and/or CAM received from other ITS-Ss. Accordingly, items of information associated with an estimated object may be updated with information received in a VAM or in a CAM, for example in a VAM or a CAM transmitted by the ITS-S associated with the estimated object. The ITS message generation module 260 of ITS-S 112 regularly generates CPMs containing the perceived object information and estimated object information.

Generation and Reception of CPM with Perceived Objects and Estimated Objects

Figure 3B:
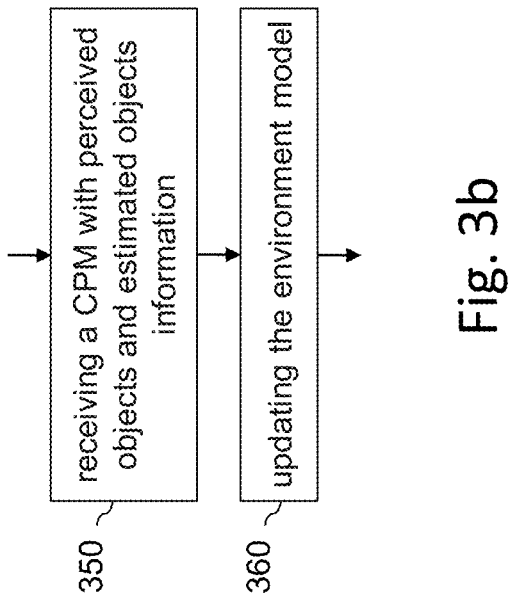
FIGS. 3a and 3b illustrate, using flowcharts, examples of general steps of methods according to embodiments of the present disclosure, respectively at an originating ITS-S sending a CPM containing information about perceived objects and about estimated objects and at a corresponding receiving ITS-S.
Figure 3A:
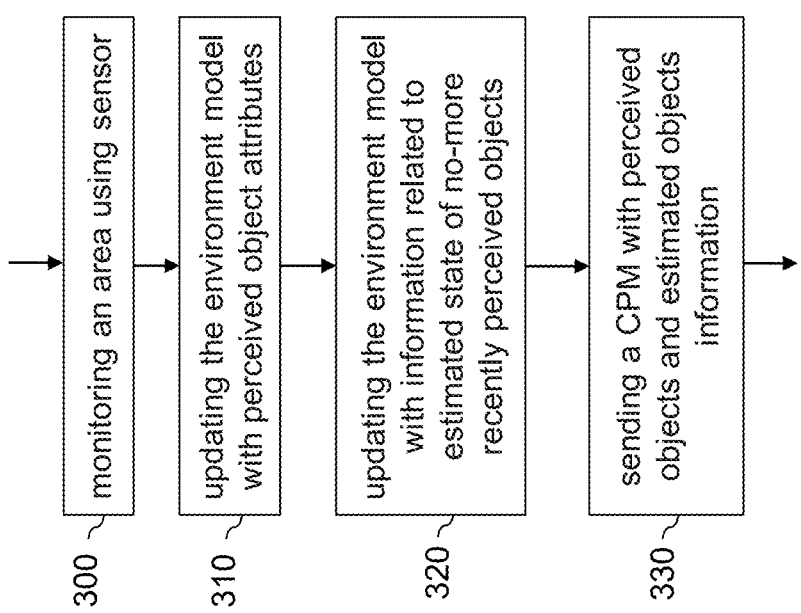

FIGS. 3a and 3b illustrate, using flowcharts, examples of general steps of methods according to embodiments of the present disclosure respectively at an originating ITS-S sending a CPM containing information about perceived objects and about estimated objects and at a corresponding receiving ITS-S.

As shown in FIG. 3a, a method of communication in an ITS according to some embodiments of the present disclosure comprises, at an originating ITS-S, e.g. RSU 110 in FIG. 1, a step of monitoring an area such as a road portion or a road intersection as illustrated in FIG. 1 (step 300). To that end, the originating ITS-S uses its sensors (e.g. sensors 120 to 123, and 210 in FIG. 2). Based on data acquired by these sensors, the perception and tracking module of the originating ITS-S (e.g., perception and tracking module 230 in FIG. 2) identifies perceived objects and updates its environment model (step 310), e.g., environment model 220 in FIG. 2. It may also update its environment model using items of information contained in ITS messages (CAMs, VAMs, CPMs, or DENMs) received from other ITS-Ss.

The estimation module of the originating ITS-S (e.g., estimation module 240 in FIG. 2) continuously analyzes the objects of environment model 220 to update information associated with previously estimated objects (for example to remove such estimated objects if the associated level of confidence is too low) and with new estimated objects (step 320), the new estimated objects being objects that are no more perceived directly by on-board sensors of the ITS-S, but whose presence may be estimated.

In a case where a new estimated object is identified, the originating ITS-S sends a CPM containing an item of information about the estimated objects (step 330) in addition to the perceived objects, for example using the CPM format illustrated in FIG. 4, 5, or 6. Selection of the items of information associated with estimated objects, that are to be transmitted within the CPM, may be done during this step. When a previously perceived object is not perceived in the last measurements, its confidence level is lowered when reported as an estimated object.

According to TS 103 324 standard, only objects associated with high confidence levels, for example confidence levels greater than a threshold (denoted C_Threshold), should be included in next generated CPM event. However, according to some embodiments of this disclosure, if the confidence level of a perceived object is lower than this threshold, the perceived object is no longer considered as a perceived object, but may be considered as an estimated object. Accordingly, perceived information associated with this object is no longer considered as such but as corresponding estimated object information if estimatedObjectInformation is available for the last measurement period in the environment model for this perceived object, that is to say if the presence of this object may be estimated. In case of radio channel congestion, the perceived objects are preferably included in priority in the next generated CPM and then the estimated objects may be included.

As illustrated in FIG. 3b, after receiving a CPM comprising items of information for perceived objects and estimated objects (step 350), a receiving ITS-S, that can be for example a vehicle or a pedestrian, may use the received CPM to update its local environment model. Next, the receiving ITS-S may update its environment model with the perceived object information and the estimated object information (step 360). The additional estimated object information enables the receiving ITS-S to anticipate hazardous situations, such as the sudden appearance of a pedestrian behind a bus, or to keep track of objects in their LDM while they are temporarily occluded.

It is observed that items of information received in an ITS message, for example in a VAM or in a CAM, may be used to update the environment model of the originating and/or of the receiving ITS-S, in particular to update estimated object information.

CPM Structure

According to some embodiments of the disclosure, the structure of the CPMs is modified to comprise estimated object information, such as an estimated position or more generally an estimated state, associated with a previously perceived object. This may occur when the confidence level does not make it possible anymore to include the object in a CPM as a perceived object.

Use of a Specific Sensor Type

FIG. 4 illustrates an example of a structure of a collective perception message, CPM, according to some embodiments of the present disclosure.

The illustrated CPM structure, referenced 400, is based on ETSI TS 103 324 Specification (V0.0.29 of May 2022). It comprises an ITS PDU header referenced 405, a CPM reference time field 406, a CPM parameters field 410, and a certificate 415.

ITS PDU header 405 may be a common header including information about the protocol version, a message type, and an ITS-S identifier (ID) of the originating ITS-S.

CPM reference time (cpmReferenceTime) field 406 is the absolute reference time of the message.

CPM parameters field 410 may contain a management container referenced 420, a station data container referenced 430, a perception data container referenced 440 containing a set of sensor information containers referenced 450, a set of perceived object containers referenced 460, and a set of free space addendum containers referenced 470.

Each container includes some data elements (DE) and/or data frames (DF). ETSI TS 102 894-2 Specification defines conventional data elements and data frames used in ITS messages.

Regardless of the type of the ITS-S generating the considered CPM, the management container provides information regarding the station type and the reference position of the originating ITS station. The message can be transmitted either by an ITS station, such as a vehicle, or by a stationary RSU. In case of a CPM generated by a vehicle, the station data container contains the dynamic information of the originating ITS station. It is not optional in case of a vehicle transmitting the CPM. In case of a CPM generated by an RSU, the station data container may provide references to identification numbers provided by the MAP Message (CEN ISO/TS 19091) reported by the same RSU. These references are required in order to match data provided by the CPM to the geometry of an intersection or road segment as provided by the MAP message. It is not required that a RSU has to transmit a MAP message for matching objects to road geometries. In this case, the station data container may be omitted. It is for this reason that the station data container is set as optional.

The sensor information container 450 that is optional, contains the set of sensor information. It provides information about the sensory capabilities of an ITS station. Depending on the station type of the originating ITS station, different sensor information specifications are available to encode the properties of a sensor. The sensor information container is attached to CPMs at a lower frequency than the other containers, as defined in ETSI TR 103 562. Up to 128 sensor information may be used in a CPM. As illustrated, an information structure 451 associated with a sensor may include:

sensorID, which is an identifier of the sensor,
  type, which is the type of the sensor (various types of sensor may be defined such as radar, lidar, monovideo, stereovision, nightvision, ultrasonic, pmd, fusion, inductionloop, sphericalCamera, itssaggregation, or uwb),
  detectionArea, which represents the area of the detection (e.g., the field of view of the camera sensor), and
  freeSpaceConfidence, which represents the confidence of the information indicating that an area is not occupied.

According to some embodiments of the disclosure, the sensor information type is extended with a new type called "estimation". When estimated object information is included in a CPM, it may thus refer to this type of sensor to inform the receiving ITS-S that this information is associated with an estimated object and not with a perceived object during the last measurement period of the originating ITS-S. As a variant, the "estimation" sensor type could be a subtype of a fusion sensor type.

The optional perceived object container 460 contains a set of perceived objects 461. It is composed of a sequence of optional or mandatory data elements (DEs) and/or data frames (DFs) which give a detailed description of the dynamic state and properties of a detected (or perceived) object.

More precisely, each object is described using the dedicated perceivedObject structure referenced 461. The first part of this structure (reference 462) contains data elements and/or data frames as defined by the ETSI TS 103 324 (V0.0.29 of May 2022) and comprises various fields including the following:

objectID, which is a data element representing an identifier assigned to a perceived object. It remains constant as long as the object is perceived by the originating ITS-S,
  timeOfMeasurement, which is a data element corresponding to the time difference for the provided measurement information with respect to the CPM reference time 406,
  the distance defined by xCoordinate, yCoordinate, and zCoordinate, which corresponds to the distance between the perceived object and the ITS-S's reference point the in x-, y-, and z-direction of the ITS-S coordinate system, respectively, for the moment of measurement, the speed defined by xSpeed, ySpeed, and zSpeed, which corresponds to the speed of the perceived object in the detecting ITS-S's reference system in the x-, y-, z-direction, respectively, for the moment of measurement, the acceleration (optional) defined by xAcceleration, yAcceleration, and zAcceleration, which corresponds to the acceleration of the perceived object from the ITS-S's reference point in the x-, y-, and z-direction, respectively, for the moment of measurement, the dimension (optional) defined by planarObjectDimension1, planarObjectDimension2, and verticalObjectDimension, which represents the dimension of the perceived object, objectRefPoint, which is a reference point of the perceived object. By default, the reference point may be the center point of the perceived object, objectAge, which is the age of the perceived object, objectConfidence, which is the confidence level associated with the perceived object. The computation of the object confidence level may be based on a sensor's or merging system confidence, on the binary detection success (i.e. the detection success of the object during the last measurements), and on the object age, sensorIDList (optional), which is a list of sensor identifiers which provided the measurement data. It refers to sensorID in the sensor information container. If the sensor information container is never provided by the originating ITS-S, the list may be populated with random numbers, where each number is assigned to a sensor of the originating ITS-S, objectDynamicStatus (optional), which is a dynamic Status providing the capabilities of the originating ITS-S to move away from the perceived object (for example, it may take one of the values dynamic, hasBeenDynamic, or static), classification (optional), which provides the classification of the perceived object. It may be composed of an object class and possibly a subclass (e.g. vehicle class has subclasses passengerCar, bus, etc.) with a class confidence value, and mapPosition, (optional), which indicates the position of the perceived object mapped onto the intersection topology description transmitted in MAP messages.

Free space addendum container 470 that is optional, contains the set of free space addendum information. It comprises a sequence of optional or mandatory data elements (DEs) which provide information about free spaces detected by a particular sensor. Each free space addendum comprises various fields such as:

freeSpaceConfidence which is the free space confidence value that applies to the entire area, freeSpaceArea, which represents the geometry of the free space area, sensorIDList, which is a list of identifiers of the sensors used to carry out the measurement to indicate the free space, and shadowingApplies, which is a Boolean indicator used to indicate whether a tracing approach should be used to compute a shadowed area behind an object.

It is noted that collective perception messages as described in TS 103 324 draft V0.0.29 with the items of information contained in data structure 462 for perceivedObject makes it possible to report the current state of an object. When an object is no more perceived, the object confidence level is decreased below a certain threshold and then, the object is not included anymore in a CPM. However, according to some embodiments of the disclosure, the presence, and more generally the state, of an object that is no longer perceived may be estimated and signaled in a CPM by replacing the measurement data of this previously perceived object by corresponding estimated object information, if available for this object, which may be done by defining a sensor of the "estimation" type and by referring to the corresponding sensorID in the sensorIDList in data structure 462. The sensorID that has performed the last measurement can also be referred in the sensorIDList in data structure 462 at the same time. Next, according to these embodiments of the disclosure, the CPM generation module of the originating ITS-S (e.g., ITS message generation module 260 in FIG. 2) may use the object position and speed contained in the estimated object information of the environment model instead of the measure object speed and position for the xCoordinate, yCoordinate, zCoordinate and xSpeed, ySpeed and zSpeed. The timeOfEstimation for the object will be used as its timeOfMeasurement.

It is observed here that it may happen that Video analytics do not detect the presence of an object at a given time while raw sensor data obtained during this given time still comprise items of information directed to this object. Accordingly, by using specific algorithms, it could be possible to keep tracking an object after it is no longer perceived, for example to keep tracking an object in a few frames (e.g., 1 or 2 frames) after it is no longer perceived. Such specific algorithms may use well known technics such as the use of Kalman filters. They could exploit data previously measured that are related to this object and/or data deliberately transmitted by this object (e.g., in a VAM or in a CAM). In such a case, the sensors referenced in the CPM may be the one from which the raw data have been obtained, the CPM comprising an indication to indicate that the object is not a perceived object but an estimated object.

According to other embodiments, the object confidence field in data structure 462 may be set to a level reflecting that the object is an estimated one instead of a measured one, for example by setting the level between a first and a second threshold. In such embodiments, it is not necessary to create a sensor of the "estimation" type.

Still according to other embodiments, a data structure such as data structure 463 may be added in data structure 461 to signal explicitly that the information contained in data structure 462 are estimated object information. For the sake of illustration, data structure 463 may contain:

estimatedFlag, which signals, when set to true, that the perceived object information in data structure 461 are estimated value provided by the estimation module of the originating ITS-S (e.g., estimation module 240 in FIG. 2). By default, this flag may be set to false, lastPerceivedTime, which specifies, when the estimated flag is true, at which time the object was last perceived (it may be an absolute time or a delta time).

According to other embodiments, a prediction data structure such as data structure 464, that contains prediction information, may be modified to indicate the estimated object information. The fields contained in such a predictions data structure may be the following:

DeltaTime, which represent the time difference between each point in a predicted path (e.g., a predicted path can contain points spaced by 100 ms), list of PredictedPath, which is a list of predicted paths associated with the object. Each predicted path may contain:
 PathProbability, which represents the probability that the object follows this predicted path,
 list of PathPoints, which is a list of points that form the predicted path. Each path point may be defined by:
  XDistanceOffset, YDistanceOffset, which represent the distance measured from the CPM reference point to the point in the x- and y-directions of the ITS-S coordinate system,
  optional covariance information for each point, that may be included with XConfidence, YConfidence, and Correlation.

According to these embodiments, the prediction data structure may be used to signal the estimation information, when an estimated object is to be included in a CPM instead of a perceived object, with the following use of the fields:
 DeltaTime is set to 0,
 only one PredictedPath is defined with a single path point indicating the estimated object position, and
 the object position and speed signaled in data structure 462 are omitted.

Using one of the previous embodiments, an originating ITS-S may signal an estimated object in the perceived object container to replace temporarily measurement data from the sensors (e.g. non-available or highly degraded measurement data) when an object is partially or fully occluded or just at the limit of the sensor detection area. It should be pointed out that estimated object information may also be provided for a previously perceived object which is currently (when the estimation is conducted (timeOfEstimation)) located outside the sensor detection area. Accordingly, a receiving ITS-S may benefit from such items of information to anticipate the possible presence of an object in the surrounding area. In the case where the receiving ITS-S was already tracking the estimated object through previously received CPMs, the use of these items of information simplifies the fusion process in the local dynamic map as the same objectID is used to signal this object. In the case where the receiving ITS-S is new in the monitored area, it is warned of the possible presence of an object no more perceived by the originating ITS-S, without having received previous CPMs signaling perception of this object.

Estimated Object Container

FIG. 5 illustrates an example of a structure of a collective perception message, CPM, extended with an estimated object container according to some embodiments of the disclosure.

The illustrated CPM structure, referenced 500, is based on the ETSI TS 103 324 Specification (V0.0.29 of May 2022). As illustrated, it comprises an ITS PDU header referenced 505, a CPM reference time filed 506, a CPM Parameters field 510, and a Certificate 515.

ITS PDU header 505, cpmReferenceTime 506, and certificate 515 are data structures that are similar to ITS PDU header 405, cpmReferenceTime 406, and certificate 415 in FIG. 4, respectively.

As illustrated, CPM Parameters field 510 contains a management container referenced 520 (similar to management container 420 in FIG. 4), a station data container referenced 530 (similar to station data container 430 in FIG. 4), a perception data container referenced 540 containing a set of sensor information containers referenced 550 (similar to sensor information containers 450 in FIG. 4), a set of perceived object containers referenced 560, a set of free space addendum containers referenced 570 (similar to free space addendum containers 470 in FIG. 4), and according to the embodiment illustrated in FIG. 5, new (compared to known technics) estimated object containers referenced 580.

Perceived object containers 560 are optional and may contain a set of perceived objects defined by data structures such as data structure 561 storing information similar to the one of data structure 462 in FIG. 4. According to the embodiment illustrated in FIG. 5, information about an object that is no longer perceived by on-board sensors of an originating ITS-S but that has estimated information (i.e., information about an estimated object) is included in a estimated object data structure such as estimated object data structure 581 in estimated object containers such as estimated object containers 580.

A receiving ITS-S implementing an early version of CPM (for example according to TR 103 562) would not be able to decode the estimated object container part, and would not be confused by the mix of estimated and measured object information as in CPM 400. According to the embodiment illustrated in FIG. 5, the perceived object containers 560 only contain information of perceived objects with data measured from on-board sensors and new containers 580 are provided to store information of estimated objects. An estimated object is described through data structure 581.

A first part of data structure 581, denoted 582, may contain the following fields to provided information about the estimated object state:
 objectID, which is the identifier of the estimated object that was previously perceived and tracked in the perceived object data structure 561,
 timeOfEstimation, which represents the time at which the estimation concerning the estimated object was made,
 the estimated distance denoted estimatedDistance that may be defined by xCoordinate, yCoordinate, and zCoordinate, which corresponds to the distance between the estimated object and the ITS-S's reference point in the x-, y-, and z-direction of the ITS-S coordinate system, respectively, for the time of estimation,
 the estimated speed estimatedSpeed (optional) defined by xSpeed, ySpeed, and zSpeed, which corresponds to the speed of the perceived object in the detecting ITS-S's reference system in the x-, y-, z-direction, respectively, for the time of estimation,
 the estimatedPresenceArea, which defined by a polygon area where the estimated object is located,
 the estimatedObjectConfidence, which represents a confidence level associated with the estimated object. The computation of the confidence level is based on a sensor's or fusion system's specific detection confidence, and the last time that there was a detection success, and the object age.

The estimatedObjectInformation in the environment model (e.g., environment model 220 in FIG. 2) may be used to fill in data structure 582.

A second part of data structure 581, denoted 583, may contain the last measurement data of the estimated object, for example the following items of information:
 lastMeasurementTime, which represents the time at which the last measurement from a sensor of the originating ITS-S was obtained for this estimated object. It may be an absolute time or a time difference using the CPM reference time 506 as reference,
 lastMeasuredPosition, which represents the last measured position of the estimated objected. It may be specified as an absolute position or as a distance from the reference position contained in the management container 520, lastMeasuredSpeed, which represents the last measured speed for the estimated object, and classification, which represents the object classification as determined during the last measurement.

The last measurements of the perceived object corresponding to the estimated object, as stored in the environment model (e.g., environment model 220 in FIG. 2), may be used to fill in the data structure 583.

Based on TS 103 324, an object identifier objectID is assigned to each perceived object. The same objectID is associated with the same object as long as this object is perceived and new sensor measurements are assigned to this object. There is no ITS pseudonym change. According to some embodiments of the disclosure, the objectID assigned to the object being estimated is the same as the objectID previously assigned to this object when it was perceived by on-board sensors of the originating ITS-S.

Accordingly, the originating ITS-S may signal an estimated object in an estimated object container to temporarily replace measurement data from on-board sensors when an object is occluded or just at the limit of the sensor detection area. In such a case, the fusion process that is carried out in a receiving ITS-S to update its local dynamic map (or environment map) takes advantage that the Object/D of the estimated object is the same as the Object/D of a previously perceived object signaled in previously received CPM to determine that the estimated object is the same as the previously perceived object. In the case according to which the receiving ITS-S is new in the monitored area, it is alerted of the possible presence of an object no more perceived without having received the previous CPMs signaling this perceived object.

Space Area Container Signaling Estimated Objects

FIG. 6 illustrates an example of a structure of a collective perception message, CPM, extended with a space area container according to some embodiments of the present disclosure.

The illustrated CPM structure, referenced 600, is based on the ETSI TS 103 324 Specification (V0.0.29 of May 2022). As illustrated, it comprises an ITS PDU header referenced 605, a CPM reference time field 606, a CPM Parameters field 610, and a Certificate 615.

ITS PDU header 605, cpmReferenceTime 606, and certificate 615 are data structures that are similar to ITS PDU header 405, cpmReferenceTime 406, and certificate 415 in FIG. 4, respectively.

As illustrated, CPM Parameters field 610 contains a management container referenced 620 (similar to management container 420 in FIG. 4), a station data container referenced 630 (similar to station data container 430 in FIG. 4), a perception data container referenced 640 containing a set of sensor information containers referenced 650 (similar to sensor information containers 450 in FIG. 4), a set of perceived object containers referenced 660, and according to the embodiment illustrated in FIG. 6, a space area container 690.

Perceived object containers 660 are optional and may contain a set of perceived objects described by data structures such as data structure 661 storing information similar to the one of data structure 462 in FIG. 4. According to the embodiment illustrated in FIG. 6, information about an object that is no longer perceived by on-board sensors of an originating ITS-S but that has estimated information (i.e., information about an estimated object) is included in a space area data structure such as data structure 691 of space area container 690.

Space area data structure 691 may contain a list of space areas with the following information for each space area:

spaceID, which is an identifier of the space area, spaceArea, which is a polygon defining the space area, and estimatedObjectIDList, which is a list of estimated objects referred by their objectID as defined in the perceived object data structure 661 when the objects were perceived by the on-board sensors.

In a variant, additional fields to describe the estimate object state can be included for each estimated object such as the one included in data structure 583 (lastMeasurementTime, lastMeasuredPosition, lastMeasuredSpeed and classification) and in data structure 582 (timeOfEstimation, estimatedDistance, estimatedSpeed, and estimatedObjectConfidence).

According to the embodiment illustrated in FIG. 6, when there is a fixed occlusion area such as area 170 in FIG. 1, due to a bridge in the illustrated example, a static space area can be defined. This makes it possible to signal any occluded object using compact CPMs by reporting temporarily occluded objects as a set of objects involved in the same occlusion area.

Service Specific Permission

Figure 7:
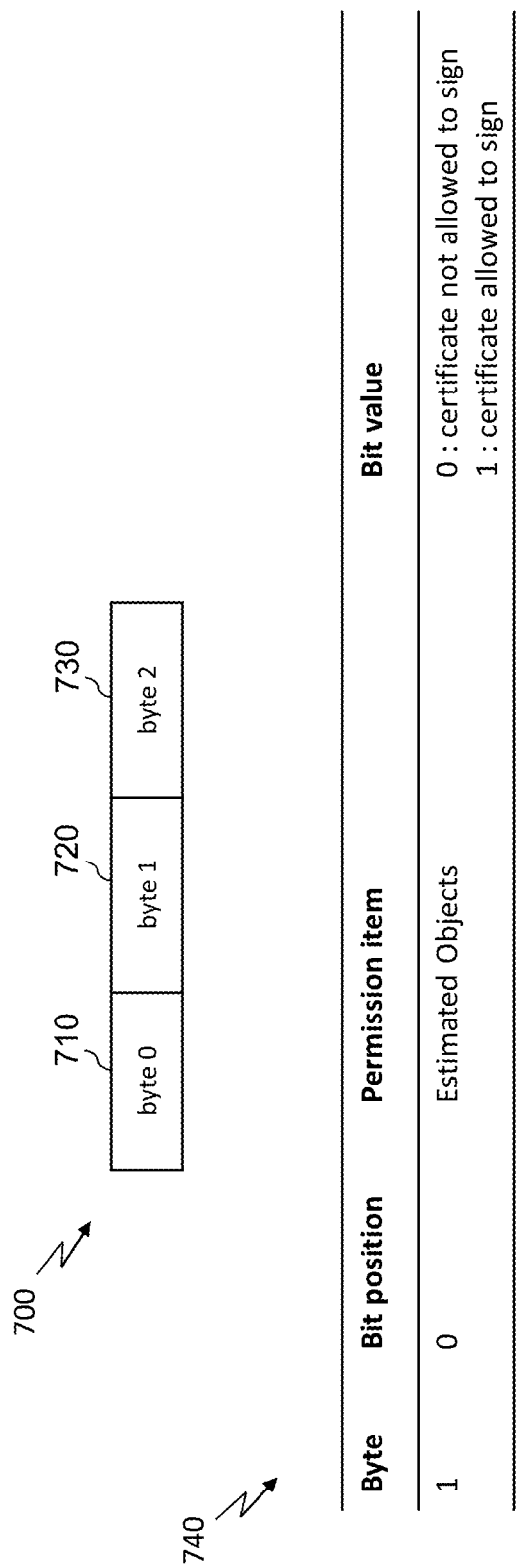
FIG. 7 illustrates an example of a service-specific permission (SSP) item which may be specified in a certificate of a CPM according to some embodiments of the present disclosure.

FIG. 7 illustrates an example of a Service Specific Permission (SSP) item which may be specified in a certificate of a CPM according to some embodiments of the present disclosure.

Back to FIG. 4, certificate 415 is attached to CPM 400 to certify the authenticity of the originating ITS-S (e.g. R-ITS-S 112 in FIG. 1) and its permission to provide ITS messages and some information they comprise. The permissions are defined in a so-called service specific permission (SSP) item within the certificate.

In order to secure V2X communications within the ITS, a public-key-infrastructure (PKI) as defined in the version 1.1.1 of the ETSI TS 102 731 specification may be used, in particular to control the integrity of a message and to authenticate an originating ITS-S. The PKI-based security may be implemented through the use of certificates delivered by a certification authority to the ITS stations.

Therefore, each ITS message exchanged is made of a non-encrypted message, CPM parameter 410, accompanied with a digital signature and a pseudonym certificate (also referred to as an authorization ticket) that validates the authenticity of the originating ITS-S and the integrity of the message, while keeping anonymity of the originating ITS-S. For communicating within the ITS, an ITS-S may comprise one or more authorization tickets and may use an authorization ticket for communicating.

Information about the estimated object, provided for example in the data structure 463 or 462 of CPM 400, 580 of CPM 500 in FIG. 5, or 690 of CPM 600 in FIG. 6 or sensor information type "estimation" as described in FIG. 4, should preferably, for security reasons, come from a station considered as secure.

The authorization ticket may therefore comprise indications related to the privileges and authorizations of an originating ITS-S to transmit specific ITS messages, for example CPM 400 comprising an object perceived by a sensor information of type "estimation" or having the estimated flag set to true, for example data CPM comprising a data structure 463 or 464, CPM 500 comprising a data structure 580 or for example CPM 600 comprising a data structure 690.

To that end, an authorization ticket may contain a field called ITS AID, which includes the list of the services that the station is authorized to access and use, as specified in ETSI TR 102 965. In particular, a specific service is dedicated to collective perception service, to indicate that the sender is entitled to send CPMs. The authorization ticket also contains a field called ITS AID service specific permission (SSP), which indicates specific sets of permission within the overall permission indicated by the ITS-AID. Its format is specified in ETSI TS 103 097.

According to some embodiments of the present disclosure, a SSP is provided, that may be specified in the certificate of CPMs containing an object perceived by a sensor information of type "estimation" or having the estimated flag set to true, or comprising a data structure 463 or 462, or comprising a data structure 580 or comprising a data structure 690 as described hereinbefore. An example of such a SSP is illustrated in FIG. 7.

As illustrated, SSP 700 comprises 3 bytes referenced 710, 720, and 730. According to this example, the first byte (byte 710) identifies an SSP version and the second and third bytes (bytes 720 and 730) specify specific permission.

Still according to the illustrated example, specific permission 740 is introduced using the first, second, and third bits of the second byte (byte 720) as follows:

the first bit is set to 1 for indicating permission for reporting an estimation information (such as data structures 463, 464, 580 or 690) in the payload of the CPM, otherwise it is set to 0.

Of course, other positions and/or values may be contemplated.

With this permission, the originating ITS-S is allowed to include in its CPM estimated object information and receiving ITS-S can trust that this ITS-S is entrusted to transmit such estimated object information.

According to some embodiments of the present disclosure, such an SSP may be provided in authorization tickets dedicated to an RSU, which are less likely to be hacked. Of course, according to some embodiments of the present disclosure, such an SSP may be provided within authorization tickets to any type of ITS-S.

Example of Use Cases

Figure 8:
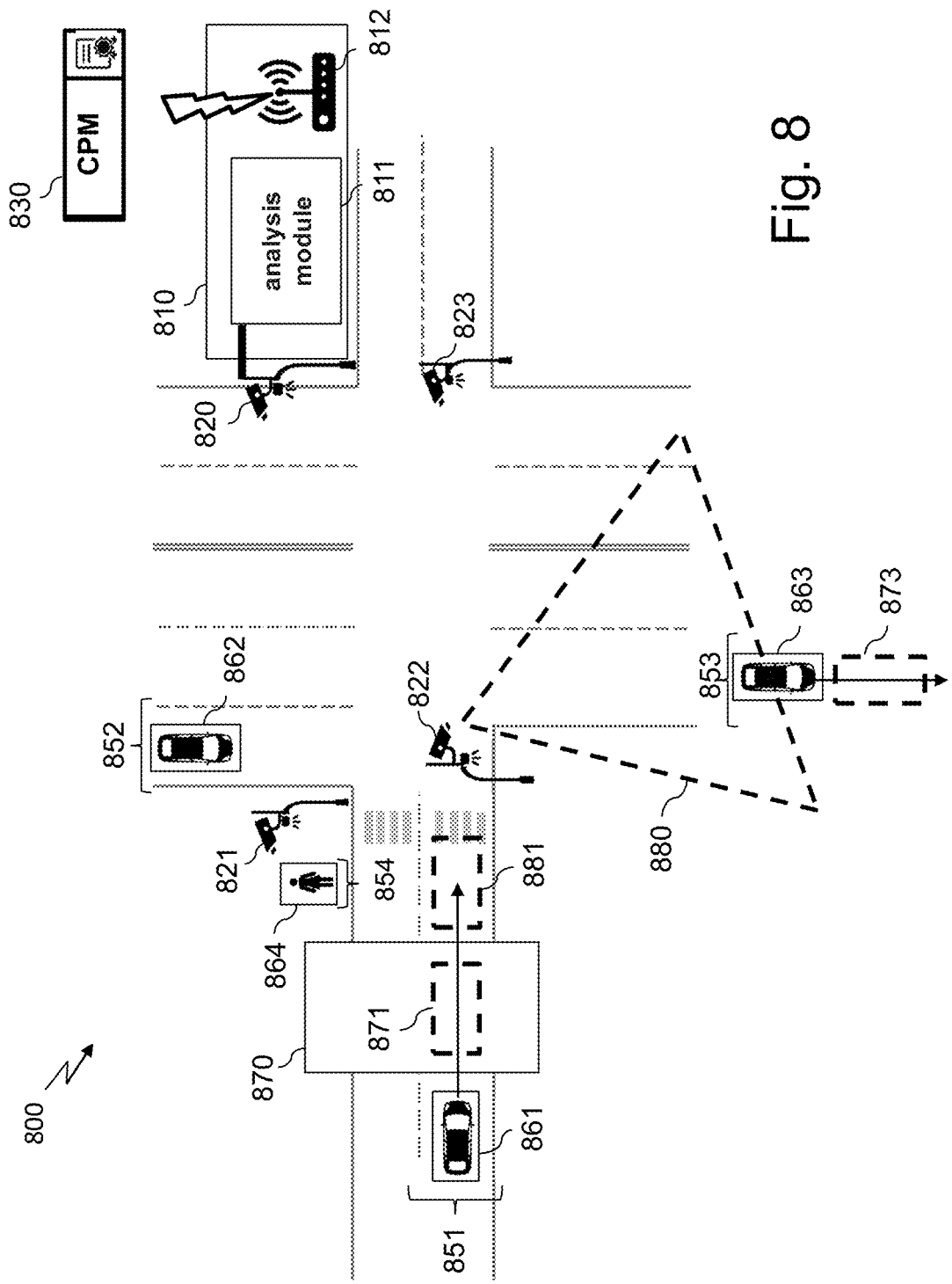
FIG. 8 illustrates a use case of some embodiments of the present disclosure, according to which the presence of a vehicle is estimated under a bridge on a roadway monitored by the ITS.

FIG. 8 illustrates a use case of some embodiments of the present disclosure, according to which the presence of a vehicle is estimated under a bridge on a roadway monitored by the ITS.

For the sake of clarity and conciseness, the intelligent transportation systems, referenced 800, is the same or is similar to the one illustrated in FIG. 1, a main difference between FIG. 1 and FIG. 8 being the presence of moving vehicle 851 to illustrate the estimation of an occluded object under a bridge and the presence of moving vehicle 853 to illustrate the estimation of an object located at the limit of a detection area (here, at the limit of a detection area 880).

Like the example illustrated in FIG. 1, an ITS station, that may generate and transmit CPMs such as CPM 830, is embedded within a road side unit, RSU, 810, that may have more processing resources to analyze behavior and predict trajectories than ITS-Ss embedded within moving vehicles. For example, an RSU may have a wider field of view than an ITS-S embedded within a vehicle, multiple fields of view, fast access to other information such as traffic conditions, traffic light status, knowledge of objects that populate the monitored area, etc.

Like ITS 100, ITS 800 is implemented at an intersection and comprises fixed road side unit 810 and several entities that may carry or comprise ITS station (ITS-S) each, for transmitting and or receiving ITS messages within the ITS. The several entities may be for example, the vehicles 851, 852, and 853 and the pedestrian 854. Likewise, fixed road side unit 810 includes a set of sensors, such as image sensors, here video cameras 820, 821, 822, and 823 and analysis module 811 to analyze data provided by the sensors.

By monitoring the area under surveillance, analysis module 811 may perceive the following objects at a reference time denoted t0:

objects 861, 862, and 863, respectively corresponding to the vehicles 851, 852, and 853 on the roadway, and object 864 corresponding to pedestrian 854 on the sidewalk.

In the illustrated example, vehicle 851 is moving and is about to pass under a bridge that forms an occlusion area denoted 870 for sensor 821 (i.e., sensor 821 cannot perceive the presence of entities in area 870). According to some embodiments, analysis module 811 determines using its estimation module (e.g., estimation module 240 in FIG. 2) that vehicle 851 is in occlusion area 870 at estimated position 871 at estimation time t1. Next, at time t2, analysis module 811, using sensor 821, perceives again vehicle 851 at measured position 881.

Based on known technic, roadside ITS-S 812 of RSU 810 may generate the following items of information related to vehicle 851 and broadcast them to other ITS-Ss within successive CPMs.

| CPM | Reference time | objectId | objectPosition |
|---|---|---|---|
| 1 | t0 | 1022 | measured position 861 |
| 2 | t1 | | (no information about vehicle 851) |
| 3 | t2 | 1026 | measured position 881 |

Based on these items of information, receiving ITS-Ss may consider the vehicle 851 as a new object at time t2 since its objectID is different in the CPM generated at t2 than in the CPM generated at to. Accordingly, the receiving ITS-Ss must launch a new fusion operation to create a corresponding object in their LDM.

According to some embodiments of this disclosure, roadside ITS-S 812 of RSU 810 generates the following items of information related to vehicle 851 and broadcast them to other ITS-Ss within successive CPMs:

| CPM | Reference time | objectId | objectPosition |
|---|---|---|---|
| 1 | t0 | 1022 | measured position 861 |
| 2 | t1 | 1022 | estimated position 871 |
| 3 | t2 | 1022 | measured position 881 |

Based on these items of information, receiving ITS-Ss may continue to track vehicle 851 through the successive received CPMs without starting any new fusion process and update their local dynamic map.

Still for the sake of illustration, vehicle 853 is leaving detection area 880. At t3, it is perceived at position 863 by sensor 822. At time t4, it is estimated at position 873 by analysis module 811. Using such estimation information, roadside ITS-S 812 of RSU 810 may, according to some embodiments of the disclosure, transmit the following items of information related to vehicle 853 within successive CPMs:

| CPM | Reference time | objectId | objectPosition |
|---|---|---|---|
| 4 | T3 | 1023 | measured position 863 |
| 5 | T4 | 1023 | estimated position 873 |

Based on these items of information, the originating ITS-S can keep the same ObjectID to report an object that is just at the limit of the detection area. In particular, this would be useful in a case where the originating ITS-S is a moving vehicle, this would facilitate the tracking of objects driving at approximately the same speed and that are at the limit of its sensor detection area.

Figure 9:
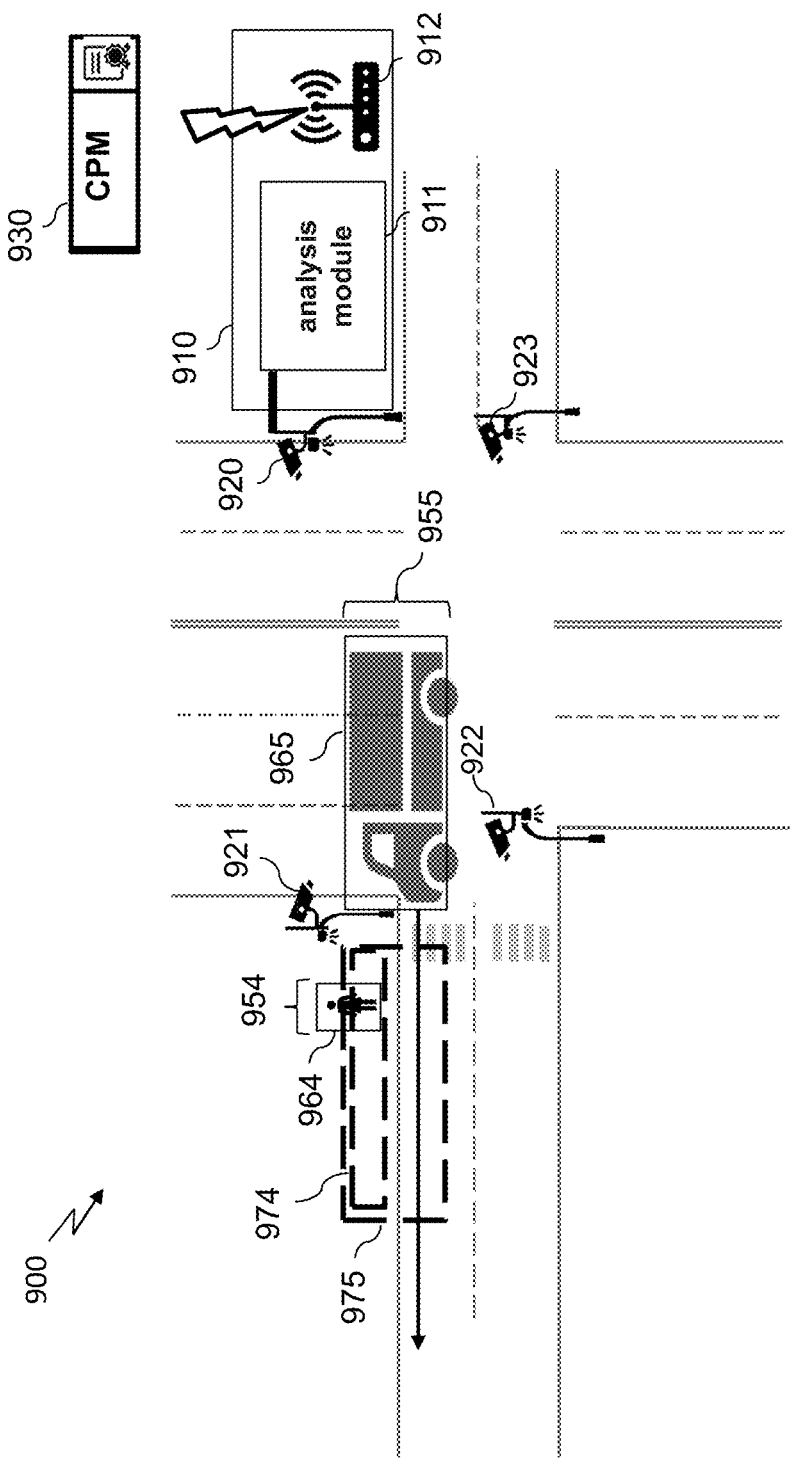
FIG. 9 illustrates an intelligent transportation system (ITS) wherein the presence of a pedestrian behind a truck on a roadway monitored by the ITS may be estimated.

FIG. 9 illustrates an intelligent transportation system (ITS) wherein the presence of a pedestrian behind a truck on a roadway monitored by the ITS may be estimated.

For the sake of clarity and conciseness, the intelligent transportation systems, referenced 900, is the same or is similar to the one illustrated in FIG. 1, a main difference between FIG. 1 and FIG. 9 being the presence on the roadway of a moving truck 955 that at some point masks pedestrian 954 located on the sidewalk.

Like the example illustrated in FIG. 1, an ITS station, that may generate and transmit CPMs such as CPM 930, is embedded within a road side unit, RSU, 910, that may have more processing resources to analyze behavior and predict trajectories than ITS-Ss embedded within moving vehicles. For example, an RSU may have a wider field of view than an ITS-S embedded within a vehicle, multiple fields of view, fast access to other information such as traffic conditions, traffic light status, knowledge of objects that populate the monitored area, etc.

Like ITS 100, ITS 900 is implemented at an intersection and comprises a stationary road side unit 910 and several entities that may carry or comprise ITS station (ITS-S) each, for transmitting and or receiving ITS messages within the ITS. The several entities may be for example the pedestrian 954 and the truck 955. Likewise, fixed road side unit 910 includes a set of sensors, such as image sensors, here video cameras 920, 921, 922, and 923 and analysis module 911 to analyze data provided by the sensors.

By monitoring the area under surveillance, analysis module 911 may perceive the following objects at a reference time denoted t0:
object 964 corresponding to pedestrian 954 on the sidewalk, and
object 965 corresponding to truck 955 on the roadway.

In the illustrated example, the truck 955 is moving from its current position at time t0 to the position represented with reference 975, as perceived by analysis module 911 at time t1. Accordingly, at time t1, the truck masks pedestrian 954 and so, analysis module 911 is not able to perceive any longer (with its sensors) object 964 that was perceived at time t0. However, according to some embodiments of the disclosure, analysis module 911 is able to analyze the situation and based on the actual position and speed of the various objects and on their history as stored in the environment model (e.g., environment model 220 in FIG. 2), the analysis module is able to estimate that the pedestrian 954 is present behind the truck, with a certain probability, in the area referenced 974 on the sidewalk. According to some embodiment of the disclosure, the presence area is transmitted by RSU 910 in a next generated CPM (rather than an estimated position for the pedestrian 954).

For the sake of illustration, roadside ITS-S 912 of RSU 910 may include the following items of information related to the monitored area in successive CPMs:

| CPM | Reference time | objectId | Classification | objectPosition | estimatedArea |
|---|---|---|---|---|---|
| 1 | t0 | 2055 | Truck | measured position 965 | |
| | | 2062 | Pedestrian | measured position 964 | |
| 2 | t1 | 2055 | Truck | measured position 975 | |
| | | 2062 | pedestrian | | estimated area 974 |

Accordingly, a new ITS-S entering into the monitored area and receiving a CPM with reference time t1 is warned of the presence of pedestrian 954 in area 974. In particular, as there is a crosswalk near this area, it alerts approaching vehicles that there is a probability that a pedestrian can cross the road behind the truck.

Figure 10:
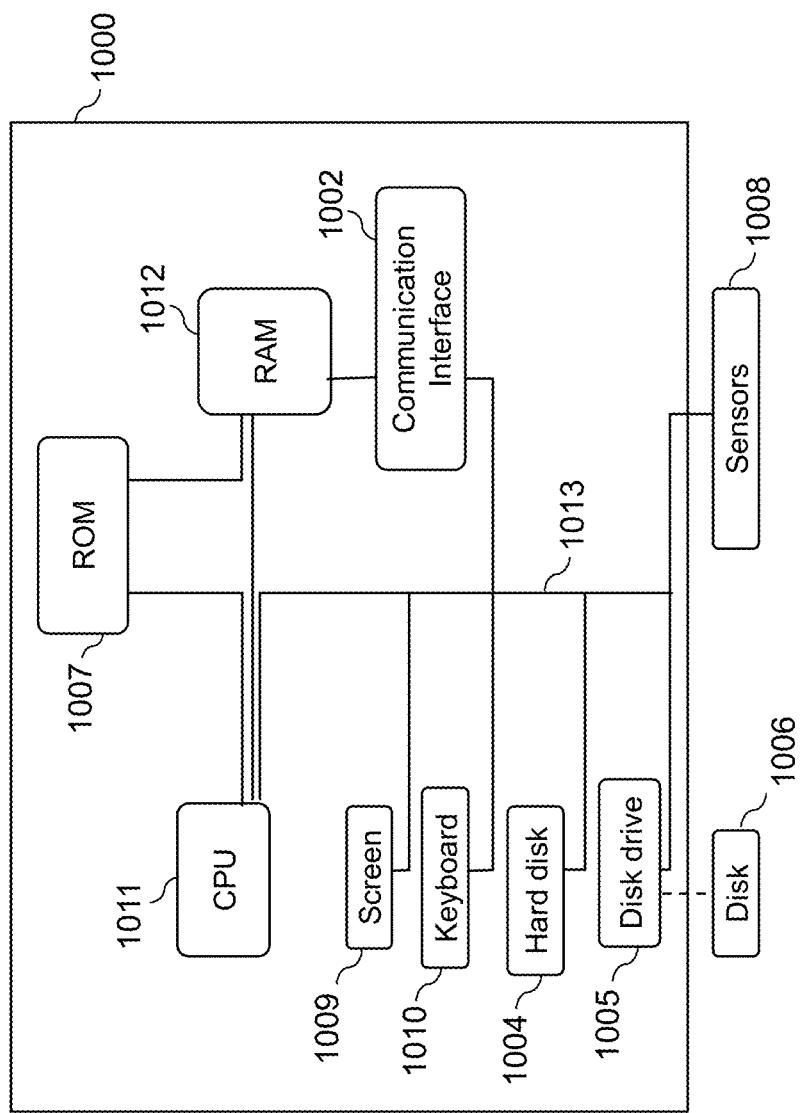
FIG. 10 is a schematic representation of an example of a communication ITS-S device configured to implement some embodiments of the present disclosure.

Example of a Hardware to Carry Out Steps of the Method of Embodiments of the Present Disclosure FIG. 10 is a schematic representation of an example of a communication ITS-S device configured to implement some embodiments of the present disclosure. It may be either an ITS-S embedded in a vehicle or in a road side unit, for example road side unit 110 in FIG. 1.

The communication device 1000 may preferably be a device such as a micro-computer, a workstation or a light portable device embedded in a vehicle or a RSU. The communication device 1000 comprises a communication bus 1013 to which there are preferably connected:
a central processing unit 1011, such as a microprocessor, denoted CPU or a GPU (for graphical processing unit);
a read-only memory 1007, denoted ROM, for storing computer programs for implementing some embodiments of the disclosure;
a random access memory 1012, denoted RAM, for storing the executable code of methods according to embodiments of the disclosure as well as the registers adapted to record variables and parameters necessary for implementing methods according to embodiments of the disclosure; and
at least one communication interface 1002 connected to the radio communication network over which ITS messages are transmitted. The ITS messages are written from a FIFO sending memory in RAM 1012 to the network interface for transmission or are read from the network interface for reception and writing into a FIFO receiving memory in RAM 1012 under the control of a software application running in the CPU 1011.

Optionally, the communication device 1000 may also include the following components:

a data storage means 1004 such as a hard disk, for storing computer programs for implementing methods according to one or more embodiments of the disclosure;

a disk drive 1005 for a disk 1006, the disk drive being adapted to read data from the disk 1006 or to write data onto said disk;

a screen 1009 for serving as a graphical interface with the user, by means of a keyboard 1010 or any other pointing means.

The communication device 1000 may be optionally connected to various peripherals including perception sensors 1008, such as for example a digital camera, each being connected to an input/output card (not shown) so as to supply data to the communication device 1000.

Preferably the communication bus provides communication and interoperability between the various elements included in the communication device 1000 or connected to it. The representation of the bus is not limiting and in particular the central processing unit is operable to communicate instructions to any element of the communication device 1000 directly or by means of another element of the communication device 1000.

The disk 1006 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the disclosure to be implemented.

The executable code may optionally be stored either in read-only memory 1007, on the hard disk 1004 or on a removable digital medium such as for example a disk 1006 as described previously. According to an optional variant, the executable code of the programs can be received by means of the communication network, via the interface 1002, in order to be stored in one of the storage means of the communication device 1000, such as the hard disk 1004, before being executed.

The central processing unit 1011 is preferably adapted to control and direct the execution of the instructions or portions of software code of the program or programs according to the disclosure, which instructions are stored in one of the aforementioned storage means. On powering up, the program or programs that are stored in a non-volatile memory, for example on the hard disk 1004 or in the read-only memory 1007, are transferred into the random access memory 1012, which then contains the executable code of the program or programs, as well as registers for storing the variables and parameters necessary for implementing the disclosure.

In a preferred embodiment, the apparatus is a programmable apparatus which uses software to implement the disclosure. However, alternatively, the present disclosure may be implemented in hardware (for example, in the form of an Application Specific Integrated Circuit or ASIC).

Although the present disclosure has been described herein above with reference to specific embodiments, the present disclosure is not limited to the specific embodiments, and modifications will be apparent to a skilled person in the art which lie within the scope of the present disclosure.

Many further modifications and variations will suggest themselves to those versed in the art upon making reference to the foregoing illustrative embodiments, which are given by way of example only and which are not intended to limit the scope of the disclosure, that being determined solely by the appended claims. In particular, the different features from different embodiments may be interchanged, where appropriate.

Each of the embodiments of the disclosure described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of communication in an intelligent transport system, ITS, comprising at an originating ITS station, ITS-S:

perceiving, at a first given time, an object within an area monitored by the originating ITS-S;

when the object is no longer perceived by the originating ITS-S at a second given time, obtaining an estimation of a state of the object at the second given time and transmitting to a receiving ITS-S a Collective Perception Message, CPM, comprising items of information related to the estimated state of the object; and transmitting a CPM comprising items of information signaling perception of the object, the CPM comprising items of information signaling perception of the object being different from and transmitted before the CPM comprising items of information related to the estimated state of the object, the items of information signaling perception of the object comprising an identifier of the object, the CPM comprising the items of information related to the estimated state of the object further comprising the same identifier of the object.

2. The method of claim 1, wherein the CPM comprising items of information related to the estimated state of the object further comprises an indication to signal that the object is not perceived.

3. The method of claim 2, wherein the indication comprises a predetermined type of a sensor from which the estimated state of the object is deemed obtained.

4. The method of claim 2, wherein the indication comprises a confidence value belonging to a predetermined range of values.

5. The method of claim 1, wherein the CPM comprising items of information related to the estimated state of the object further comprises a specific data structure comprising a list of at least one estimated object which is no longer perceived, the list of at least one estimated object comprising the object.

6. The method of claim 1, wherein the CPM comprising items of information related to the estimated state of the object further comprises a specific data structure comprising a list of at least one area that contains objects no longer perceived, the list of at least one area comprising an area where an estimated position of the object is located.

7. The method of claim 1, wherein the items of information related to the estimated state of the object comprise an indication of a presence of the object, an estimated position of the object, an estimated trajectory including the estimated position of the object and a set of consecutive estimated positions, and/or an estimated velocity of the object.

8. A method of communication in an intelligent transport system, ITS, comprising at a receiving ITS station, ITS-S:

receiving from an originating ITS-S a Collective Perception Message, CPM, comprising items of information related to an estimated state of an object;

determining the estimated state of the object from the received CPM; and receiving a CPM comprising items of information signaling perception of the object, the CPM comprising items of information signaling perception of the object being different from and transmitted before the CPM comprising items of information related to the estimated state of the object, the items of information signaling perception of the object comprising an identifier of the object, the CPM comprising the items of information related to the estimated state of the object further comprising the same identifier of the object.

9. The method of claim 8, wherein the indication comprises a predetermined type of a sensor from which the estimated state of the object is deemed obtained.

10. The method of claim 8, wherein the indication comprises a confidence value belonging to a predetermined range of values.

11. The method of claim 8, wherein the CPM comprising items of information related to the estimated state of the object further comprises a specific data structure comprising a list of at least one estimated object which is no longer perceived, the list of at least one estimated object comprising the object.

12. The method of claim 8, wherein the CPM comprising items of information related to the estimated state of the object further comprises a specific data structure comprising a list of at least one area that contains objects no longer perceived, the list of at least one area comprising an area where an estimated position of the object is located.

13. The method of claim 8, wherein the items of information related to the estimated state of the object comprise an indication of a presence of the object, an estimated position of the object, an estimated trajectory including an estimated position of the object and a set of consecutive estimated positions, and/or an estimated velocity of the object.

14. A non-transitory computer-readable storage medium storing instructions of a computer program for implementing each of the steps of the method according to claim 1.

15. An Intelligent Transport System, ITS, station, ITS-S, comprising a processing unit configured for carrying out each of the steps of the method according to claim 1.

16. A Collective Perception Message, CPM, to transmit information in an Intelligent Transport System, ITS, comprising items of information signaling perception of the object, the CPM comprising items of information signaling perception of the object being different from and transmitted before the CPM comprising items of information related to the estimated state of the object, the items of information signaling perception of the object comprising an identifier of the object;

items of information related to an estimated state of an object further comprising the same identifier of the object; and comprising an indication to signal that the object is not perceived by an originating ITS-S sending the CPM at the time of sending the CPM.

* * * * *